US012664510B2

(12) United States Patent
Jones

(10) Patent No.: US 12,664,510 B2
(45) Date of Patent: Jun. 23, 2026

(54) SYSTEM AND METHODS FOR MAXIMIZING MARGINS TO SELL FOOD FOR FARMING INDUSTRY

(71) Applicant: FARMEREATS, LLC, Reddick, FL (US)

(72) Inventor: Dalyn Jones, Reddick, FL (US)

(73) Assignee: FARMEREATS, LLC

( * ) Notice: Subject to any disclaimer, the term of this patent is extended or adjusted under 35 U.S.C. 154(b) by 0 days.

(21) Appl. No.: 18/967,788

(22) Filed: Dec. 4, 2024

(65) Prior Publication Data

US 2025/0182040 A1      Jun. 5, 2025

Related U.S. Application Data

(60) Provisional application No. 63/605,597, filed on Dec. 4, 2023.

(51) Int. Cl.
*G06Q 10/0835*      (2023.01)
*G06K 19/06*      (2006.01)
*G06Q 10/087*      (2023.01)

(52) U.S. Cl.
CPC ...  *G06Q 10/0835* (2013.01); *G06K 19/06037* (2013.01); *G06Q 10/087* (2013.01)

(58) Field of Classification Search
CPC .............................................. G06K 19/06037
See application file for complete search history.

(56) References Cited

U.S. PATENT DOCUMENTS

| | | | |
|---|---|---|---|
| 7,150,395 B1 | 12/2006 | White | |
| 7,168,525 B1 | 1/2007 | Jacobs | |
| 8,009,864 B2 | 8/2011 | Linaker et al. | |

(Continued)

FOREIGN PATENT DOCUMENTS

KR      20220108331 A   *   8/2022   ............. G06Q 50/02

OTHER PUBLICATIONS

Software Designed to Grow and Manage Your CSA or Food Hub by Farmigo, Nov. 30, 2023 https://web.archive.org/web/20231130101702/ https://www.farmigo.com/ (Year: 2023).*

(Continued)

*Primary Examiner* — Rupangini Singh
(74) *Attorney, Agent, or Firm* — Gearhart Law, LLC

(57) ABSTRACT

This system provides a technical solution for managing product sales, inventory, and deliveries through QR codes and predictive analytics. It incorporates algorithms that generate and assign unique QR codes to products based on real-time sales data from farmers. These QR codes provide direct links to product information, facilitating efficient inventory management and customer engagement. The system also leverages predictive analytics to forecast product demand by analyzing historical sales data, adjust inventory levels, and optimize delivery driver assignments based on proximity to farms. The hardware supporting the system includes servers, processors, network components, and scanning devices to ensure reliable operation and data synchronization. By automating QR code generation, integrating sales data, and dynamically assigning drivers, the system improves operational efficiency, minimizes errors, and enhances the customer experience.

20 Claims, 34 Drawing Sheets

(56) References Cited

U.S. PATENT DOCUMENTS

| | | | |
|---|---|---|---|
| 8,091,782 | B2 | 1/2012 | Cato et al. |
| 9,996,818 | B1 | 6/2018 | Ren et al. |
| 10,169,660 | B1 | 1/2019 | Ren et al. |
| 10,796,261 | B2 | 10/2020 | Schmaltz et al. |
| 11,100,565 | B2 | 8/2021 | Brannigan et al. |
| 2008/0262865 | A1 | 10/2008 | Cotton et al. |
| 2015/0310601 | A1 | 10/2015 | Rodriguez et al. |
| 2016/0030895 | A1 | 2/2016 | Griffin et al. |
| 2017/0011334 | A1* | 1/2017 | Colimon .......... G06K 19/06037 |
| 2018/0284093 | A1 | 10/2018 | Brown et al. |
| 2018/0315319 | A1* | 11/2018 | Spector ................ G08G 1/0104 |
| 2020/0184416 | A1 | 6/2020 | Javaheri |
| 2021/0334881 | A1* | 10/2021 | Brannigan ......... G06Q 30/0635 |
| 2022/0147966 | A1* | 5/2022 | Babcock .............. G06Q 20/405 |
| 2022/0391825 | A1 | 12/2022 | Bogolea et al. |
| 2025/0182040 | A1 | 6/2025 | Jones |

OTHER PUBLICATIONS

GIS for Transportation by Equator dated Jan. 29, 2023 https://web.archive.org/web/20230129230458/https://equatorstudios.com/gis-data-and-analysis/gis-for-transportation (Year: 2023).*

NECE Reference Addresses and Codification System dated Jun. 2, 2023 https://web.archive.org/web/20230602044706/https://unece.org/trade/wp7/Meat-Standards (Year: 2023).*

Stonyhill Farms, dated Sep. 29, 2023 https://web.archive.org/web/20230929102144/https://stonyhillfarms.com/farm-market/certified-organic-nj-farm/ (Year: 2023).*

"A Farmer-Owned Local Food App Stands Out from the Venture Capital-Backed Crowd" by Lela Nargi, dated Oct. 1, 2023 https://web.archive.org/web/20230601000000*/https://civileats.com/2021/07/12/a-farmer-owned-local-food-app-stands-out-from-the-venture-capital-backed-crowd/ (Year: 2023).*

CSA Customer Testimonials, by Alstede Farms, dated Sep. 21, 2023 https://web.archive.org/web/20230921121350/https://www.alstedefarms.com/community-supported-agriculture-testimonials/ (Year: 2023).*

Kelsey Shah, "North Idaho Cuisine", Apr. 28, 2022 https://www.facebook.com/groups/northidahocuisine/posts/1948405942015818/ (Year: 2022).*

Carvalho et al., "Instance Segmentation for Large, Multi-Channel Remote Sensing Imagery Using Mask-RCNN and a Mosaicking Approach", Remote Sensing, Dec. 2020, 24 pages, vol. 13, No. 1, MDPI, Basel, Switzerland.

Vats et al., "Enhancing Retail Checkout Through Video Inpainting, YOLOv8 Detection, and DeepSort Tracking", Proceedings of the IEEE/CVF Conference on Computer Vision and Pattern Recognition Workshops (CVPRW), Jun. 2023, pp. 5530-5537, IEEE, Vancouver, Canada.

Lightspeed Commerce Inc., Retail Inventory Management Software | POS System, Lightspeed, https://www.lightspeedhq.com/pos/retail/inventory-management-software/, 3 pages.

Divine Flavor, Produce Traceability: A Simple System for Tracking Product from the Farm to the Customers, Divine Flavor, Mar. 4, 2020, https://divineflavor.com/2020/03/04/produce-traceability-a-simple-system-for-tracking-product-from-the-farm-to-the-customers/, 11 pages.

Farmbrite, Resource Management Software, Farmbrite, https://www.farmbrite.com/resource-management, 3 pages.

* cited by examiner

FIG. 1A               FIG. 1B
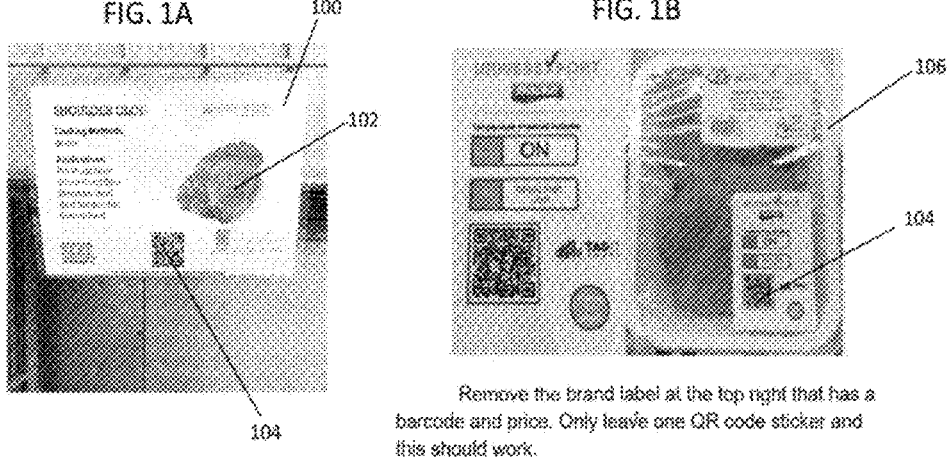
Remove the brand label at the top right that has a
barcode and price. Only leave one QR code sticker and
this should work.
FIG. 1C

500

800

900

1100

1500

1700

2100

2200

2300

*FIG. 25*

2600

2700

2800
*FIG. 28*
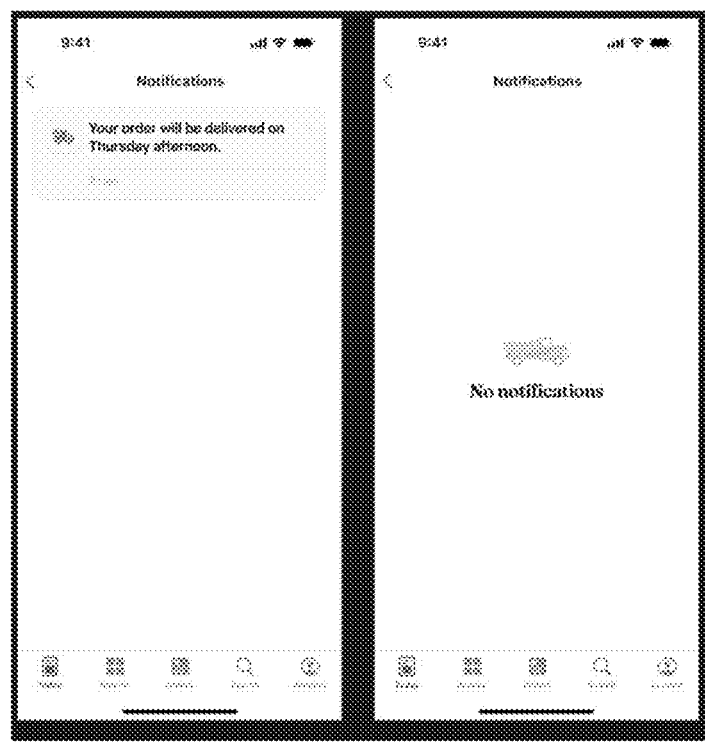

2900

3000

3100

*FIG. 32*
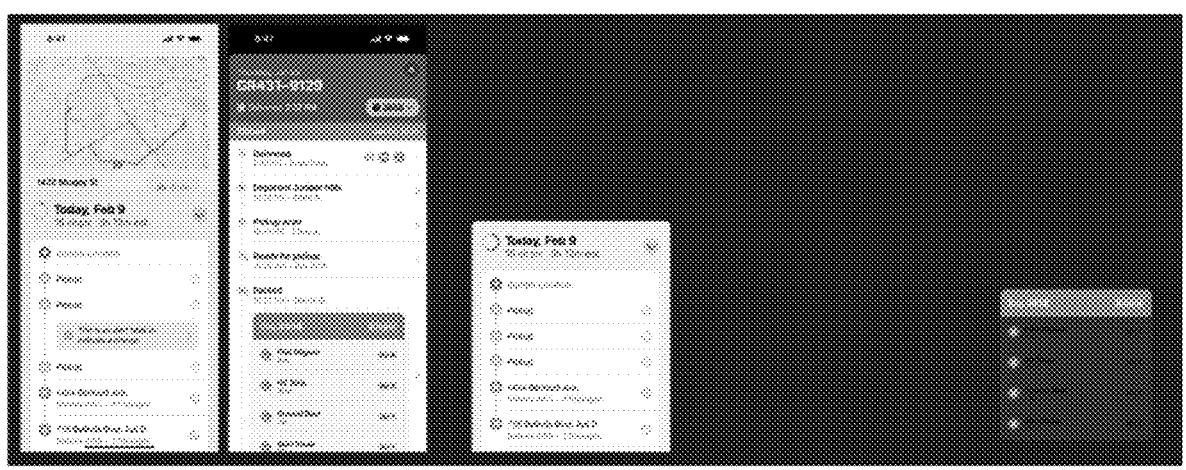

3300

3400

SYSTEM AND METHODS FOR MAXIMIZING MARGINS TO SELL FOOD FOR FARMING INDUSTRY

CROSS-REFERENCE TO RELATED APPLICATIONS

This Application is a U.S. Non-Provisional Utility Patent Application, entitled, "SYSTEM AND METHODS FOR MAXIMIZING MARGINS TO SELL FOOD FOR FARMING INDUSTRY" of U.S. Provisional Patent Application No. 63/605,597 filed Dec. 4, 2024, the entire contents of which are hereby incorporated by reference in their entirety.

FIELD OF THE EMBODIMENTS

The field of the invention and its embodiments relate to a farm-to-table delivery app that functions both as a marketplace for order fulfillment. In particular, it concerns delivery, marketing, as another tool for farmers to organize inventory, and have analytics reports on customer data on products.

BACKGROUND OF THE EMBODIMENTS

Selling products directly from a farm involves a range of logistical, regulatory, and economic challenges that farmers must navigate to ensure the success and sustainability of their operations. Farmers may encounter various obstacles when it comes to selling products directly from their farms. For example, one challenge is establishing reliable market channels. Finding consistent and trustworthy buyers, whether they are local markets, restaurants, and/or individual consumers, may be a complex and time-consuming task. Another challenge is compliance with regulatory standards. Farmers must navigate a web of stringent regulations related to food safety, labeling, and packaging. Ensuring that their products meet these requirements is crucial to avoid legal issues and maintain consumer trust. Distribution logistics pose another challenge. Farmers need to manage storage, packaging, and transportation of their products, which may be particularly demanding for small-scale operations with limited resources. The seasonal nature of farming may add another layer of complexity. The availability of products fluctuates throughout the year, leading to variations in income. This necessitates careful financial planning and resource management.

Farmers may also encounter challenges when it comes to selling products directly from their farms and may rely on marketing and branding of their farm products for attracting customers. Creating a strong online presence, developing appealing packaging, and differentiating products from competitors are all essential components of successful marketing strategies. However, organizing and executing many of these these marketing tasks is a constant concern for farmers. It would be more desirable for a farmer to have a platform enabling them to stay attuned to market trends and understanding consumer preferences to ensures that their products remain relevant and in demand, allowing farmers to adjust their production strategies accordingly. Currently, limited access to technology, modern farming equipment, and resources may hinder a farmer's ability to efficiently produce and sell their products. Overcoming these technological barriers is essential for maintaining competitiveness in the market.

In summary, selling products directly from a farm involves a multitude of challenges, including market access, regulatory compliance, distribution logistics, seasonal variability, marketing, pricing, competition, weather risks, market trends, and technological limitations. Addressing these challenges requires strategic planning, adaptability, and a thorough understanding of both the agricultural industry and the broader market landscape. Accordingly, there remains a need for an improved system and method for selling farm grown products and delivering to consumers, the locally grown products. This need and other needs are satisfied by the various aspects of the present disclosure.

SUMMARY OF THE EMBODIMENTS

In accordance with the principles of the present invention, a method for order fulfillment for the process including receiving, processing, and delivering orders from a farm to customers. This process may involve tasks such as picking items from inventory, packing them, and shipping them out for delivery. Order fulfillment is an aspect of ensuring that customers receive their products in a timely and accurate manner. It encompasses various activities related to inventory management, warehouse operations, and transportation logistics. This system also includes improvements that overcome the limitations of prior systems and methods for order fulfillment, and is now met by a new, useful, and non-obvious invention.

BRIEF DESCRIPTION OF THE DRAWINGS

To more fully understand the invention, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

FIG. 1A is an illustration of an embodiment of a menu having a QR code with a product option the farm is selling on the app, according to an embodiment.

FIGS. 1B-1C is an illustration of an embodiment of QR code 104 is affixed to item packaging 106 the farm is selling on the app, according to an embodiment.

FIG. 25 is an illustration of a device showing an operational sequence for a user adding delivery address data when running the farm-to-table delivery app, according to an embodiment.

FIG. 28 is an illustration of a device showing an operational sequence for a user receiving a notification when running the farm-to-table delivery app, according to an embodiment.

FIG. 32 is an illustration of a device showing an operational sequence for a driver receiving route data when running the farm-to-table delivery app, according to an embodiment.

DESCRIPTION OF THE PREFERRED EMBODIMENTS

Figures 2A, 2B, 2C:
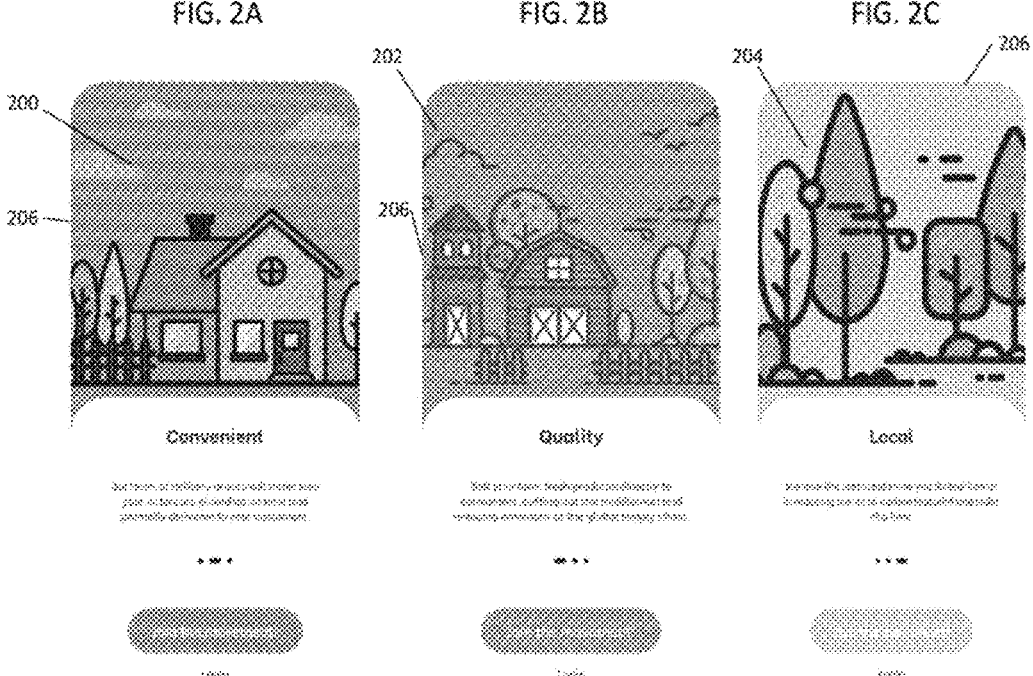
FIG. 2A is an illustration of a device showing an operational sequence, within a farmer interface, that may be performed when running the farm-to-table delivery app, according to an embodiment.
FIG. 2B is an illustration of a device showing an operational sequence, within a driver interface, that may be performed when running the farm-to-table delivery app, according to an embodiment.
FIG. 2C is an illustration of a device showing an operational sequence, within a customer interface, that may be performed when running the farm-to-table delivery app, according to an embodiment.

The following describes various examples of the present technology that illustrate various aspects and embodiments of the invention. Generally, examples may use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an," and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention, Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

FIGS. 1-34 illustrate a computer system and method for implementing a farm-to-table delivery platform. The system comprises one or more processors, memories, and computer-readable hardware storage devices, which store program code executable by the processors to facilitate various operations within the platform. These operations include providing a menu of farm products, generating a Quick Response (QR) code for individual items, packaging products, and affixing the QR code to the packaging. The QR code enables inventory management by being scanned to add products to the system. The method further allows users to select a farm and submit orders for the desired products. Once an order is placed, the system assigns it to a driver located within a predetermined proximity to the farm. The driver is then provided with relevant data associated with the order, streamlining the delivery process. Additionally, the platform facilitates order fulfillment by ensuring that all steps, from inventory tracking to driver assignment, are executed efficiently, offering users a smooth and transparent farm-to-table experience. The figures provide a detailed visualization of these processes, highlighting the system's ability to integrate QR code technology with order management, inventory tracking, and delivery coordination.

FIG. 1A is an illustration of an embodiment of menu 100 having QR code 104 with product option 102 the farm is selling on the app. In an embodiment, Farmer Eats Bar-Code Solutions includes the use of QR codes that farmers may scan and confirm. Electronic devices having a display include smart phones such as, Android and/or IOS devices have built-in features in their cameras for reading QR codes, eliminating the need for a third-party software and/or additional algorithms. To facilitate communication with farmers and confirm the products they intend to sell on the app, Farmer Eats provides a QR code scanning process. When a farmer scans the QR code, a screen and/or a display of an electronic device including, but not limited to a smart phone, a tablet, and/or a computer, will display the product's category, specific type, and cut. This information is recorded and stored in a database to provide farmers with accurate inventory details on the Farmer Bats App.

Generating QR codes for inventory tracking is done before farmers may scan them. Farmer Eats' internal team creates and distributes QR codes to farmers for affixing on their products as shown in FIGS. 1B and 1C. There are readily available online QR code generators configured for generating QR codes. The app is configured to store the numerical inventory count. This may be achieved within the app each time QR code 104 is affixed to item packaging 106 and scanned by a QR code reader, In one embodiment, the QR codes embedded within the system encode specific information to facilitate streamlined product identification and inventory management. The information encoded in the barcode encompasses three primary categories, ensuring comprehensive product details are readily accessible. The first category identifies the product category, such as Beef, Chicken, Fish, or Produce, providing a high-level classification of the item.

For example, a QR code for a cut of meat would specify whether it belongs to the beef or chicken category. The second category delves deeper into the type of product, specifying items such as Chicken Wings, Wagyu, Tomatoes, or Salmon, which allows for greater specificity and assists in accurate order fulfillment. The third category includes details about the cut type, where applicable, adding another layer of granularity. For instance, cuts of Wagyu beef might include Ribeye, Striploin, or Tenderloin, while fish such as Salmon could indicate Top Loin, Belly, or Tail. It is worth noting that not all product categories may require a cut-type specification. For example, produce items including, but not limited to, tomatoes typically do not include this level of detail. By encoding this rich, hierarchical information, the QR codes enable efficient tracking, categorization, and customer-facing transparency, enhancing the operational efficiency of the farm-to-table delivery process.

In an embodiment, the technical solution to scanning QR codes for product inventory involves generating a unique QR code for each product, encoded with information such as product category, type, and cut, which links directly to the farm's inventory database. The QR code is affixed to the product packaging by the farmer. Users of the mobile application, which is compatible with both Android and iOS, can scan the QR code using the device's built-in camera, with the app employing libraries like ZXing or ZBar to decode the information. After scanning, the app sends the decoded data to the server-side inventory management system, updating the product's details in the farm's real-time inventory database. This cloud-based system ensures that inventory data is synchronized across all connected devices, keeping track of stock levels as products are added or removed.

For placing an order, the app provides an intuitive interface where users can browse through a list of farms, categorized by proximity, product types, or ratings. A search function allows filtering based on these criteria. Upon selecting a farm, the user is presented with a menu of available products, ensuring that only in-stock items are displayed. The user can select products, specify quantities, and add them to their cart. After checking out and providing payment details, the app sends the order information to the backend system, which processes the payment and confirms product availability. The farm's inventory is updated to reflect the products ordered, and the order details are stored for fulfillment by a designated driver.

Assigning the order to a driver is facilitated through real-time GPS tracking. The app continuously tracks the location of drivers and uses location-based services, such as Google Maps or Mapbox, to calculate distances between the farm and available drivers. When a customer places an order, the system identifies the closest available driver within a predefined radius, such as 10 miles, and assigns the order to that driver. The driver is notified via the app with details of the order, including the farm location, the products to be picked up, and the customer's delivery address. The app also displays an optimal route for the driver, considering real-time traffic data. As the driver completes the delivery, the customer can track the order's progress in real-time, with status updates provided as the order moves through various stages, such as "Picked up", "In Transit", and "Delivered."

Data obtained from each scan of the label on a product by a QR code reader may be recorded through the electronic device such as a phone. The data may be stored in a database categorized under the above-mentioned criteria. This system allows for effective tracking and analysis of data within the Farmer App. The system encompasses a functionality for generating QR codes and barcodes for the products, Additionally, it introduces a potential revenue source for Farmer Eats. This involves establishing categories for farmers' inventory counts, where farmers may opt to pay a monthly subscription fee to access the app. This subscription unlocks specific privileges such as complete inventory management. Furthermore, it grants them the advantage of having their farms featured at the top of the marketplace, facilitating easy product visibility and access for other consumers.

The barcode system involves a straightforward process for farmers. Their task is simply to scan and proceed. To facilitate this, Farmer Eats takes on the responsibility of generating barcodes based on the sales sheet provided to them. A barcode scanner may be provided within Farmer Eats, eliminating the need for farmers to purchase a separate barcode scanner or manually input information. In an embodiment, CODE 39 barcode types are deemed suitable for both IOS and Android platforms. This format, along with CODE 128, proves to be highly effective for inventory purposes, and online tools are available for generating these barcodes at no cost. To implement this, a barcode scanning algorithm is used by the Farmer Eats application.

This app serves as a comprehensive farm-to-table solution encompassing delivery, marketing, and a valuable tool for farmers to efficiently manage their inventory and access analytical reports on customer preferences. Its user-friendly interface and integrated QR code system streamline inventory management, eliminating the need for manual input. Additionally, it provides valuable insights into customer consumption habits. In its second phase, the app will introduce a food scanner feature, enabling users to identify and add products to their inventory through photos, further simplifying the process. The direct farm-to-table delivery platform establishes a direct connection between consumers and farmers, offering seasonal selections and year-round produce. Furthermore, the app utilizes logistics and ordering system for operations.

FIG. 2A is an illustration of a device 206 showing an operational sequence, within a farmer interface 200, that may be performed when running the farm-to-table delivery app. A method is described using the farm-to-table delivery app starting from when a customer makes a purchase all the way through the order fulfillment covering all three types: Farmer, Driver and Customer. Each type (Farmer, Driver and Customer) may create an account and onboard by answering a list of questions that are unique to each user type. After a user has registered a profile within farmer interface 200 and been approved by admin, the menu of products the farm produces and offers for sale is submitted to an admin. Upon delivering this data, a user may control the inventory count directly on the application. A user may begin to set up their farm profile to be displayed to a customer on a display of a customer's electronic device.

FIG. 2B is an illustration of a device 206 showing an operational sequence, within a driver interface 202, that may be performed when running the farm-to-table delivery app.

FIG. 2C is an illustration of a device 206 showing an operational sequence, within a customer interface 204, that may be performed when running the farm-to-table delivery app, according to an embodiment.

Figures 3A, 3B, 3C, 3D, 3E:
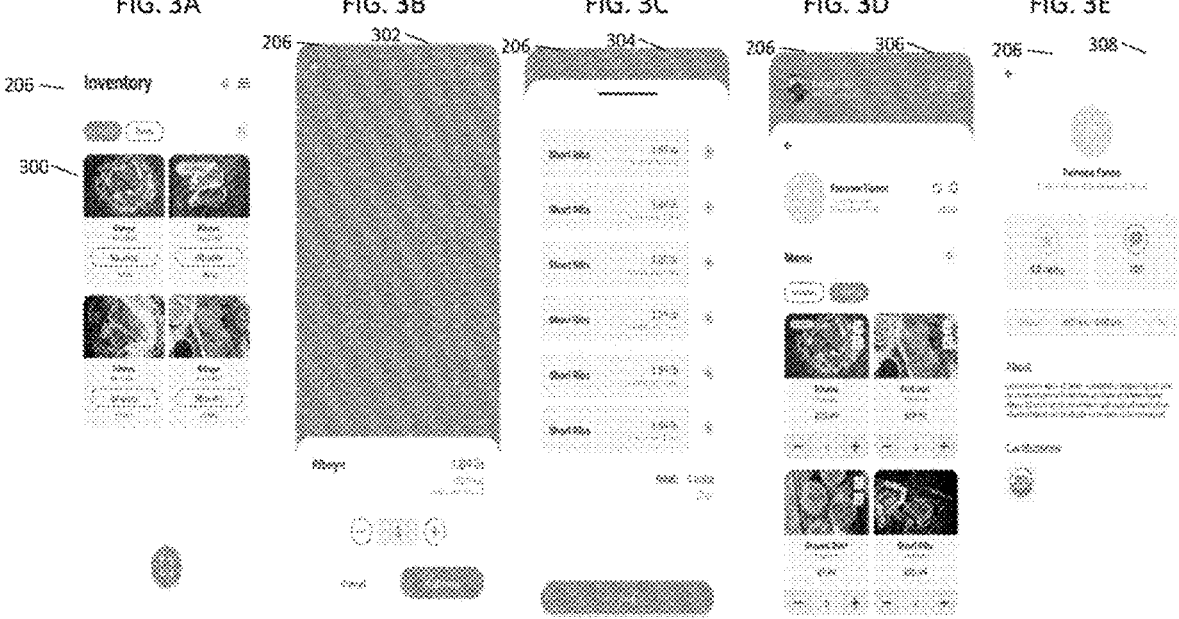
FIGS. 3A-3E are an illustration of a device showing an operational sequence, within a farmer interface, that may be performed when running the farm-to-table delivery app, according to an embodiment.

FIGS. 3A-3E are an illustration of device 206 showing a variation of operational sequences of Farmer Eats Order Logistics, within a farmer interface, that may be performed when running the farm-to-table delivery app. FIG. 3A shows at 300, the operational sequence includes a menu of products available. FIG. 3B shows at 302, the operational sequence includes a product, weight, cost, and the quantity of the product selected. FIG. 3C shows at 304, the operational sequence includes an itemization of selected products and the associated grand total. Once the product is selected and added to the cart, the user will check out with their preferred payment method. FIG. 3D shows at 306, the operational sequence includes a purchase option in which a user may either purchase "A La Carte" or bundles from a desired farm. FIG. 3E shows at 308, the operational sequence includes a rating, certifications, hours of operation, and information about a selected farm.

Figures 4A, 4B, 4C:
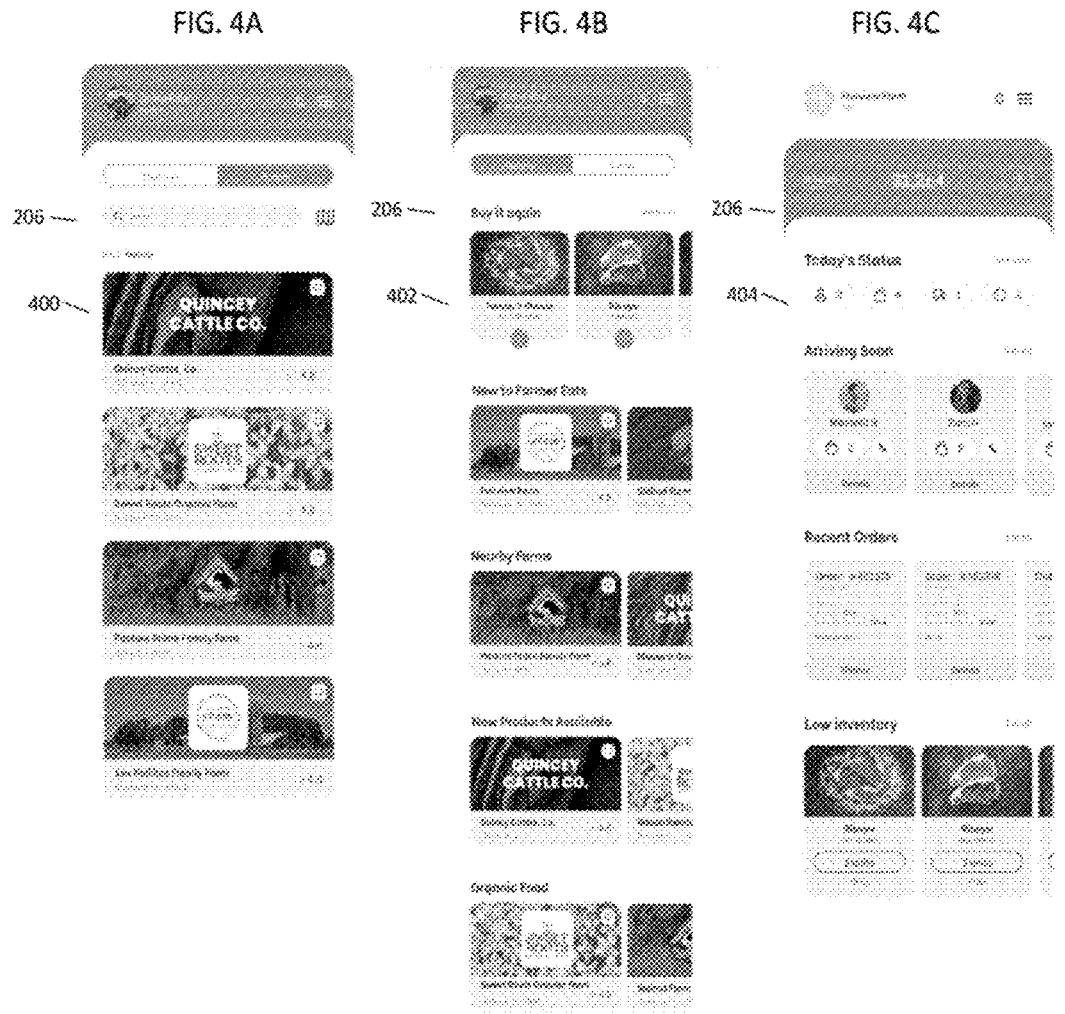
FIGS. 4A-4C are an illustration of a device showing an operational sequence, within a farmer interface, that may be performed when running the farm-to-table delivery app, according to an embodiment.

As best shown in FIG. 4A, at 400, the operational sequence includes a listing of farms that a user may browse for products produced by each farm. When a customer logs onto the dashboard of the app, they are able to locate the farms available so they may purchase a product. FIG. 4B shows at 402, the operational sequence includes a Discover platform in which a user may view a history of recent transactions, nearby farms, products available, among other information related to various farms and/or organic farms. FIG. 4C shows at 404, the operational sequence includes a balance due, order status, recent orders, and/or low inventory.

Figure 5:
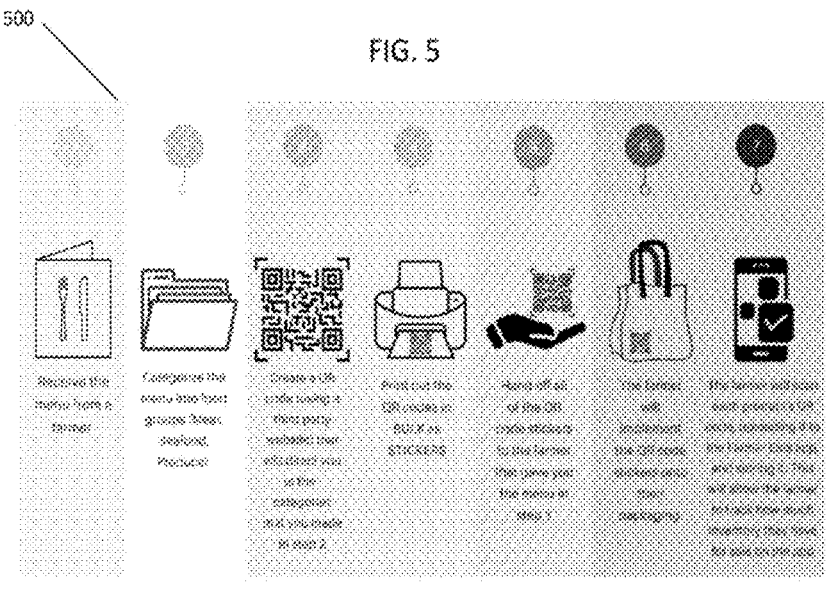
FIG. 5 is an illustration of workflow 500 for farmer inventory management system using a QR code, according to an embodiment.

FIG. 5 is an illustration of a workflow 500 for farmer inventory management system using a QR code.

Figure 6:
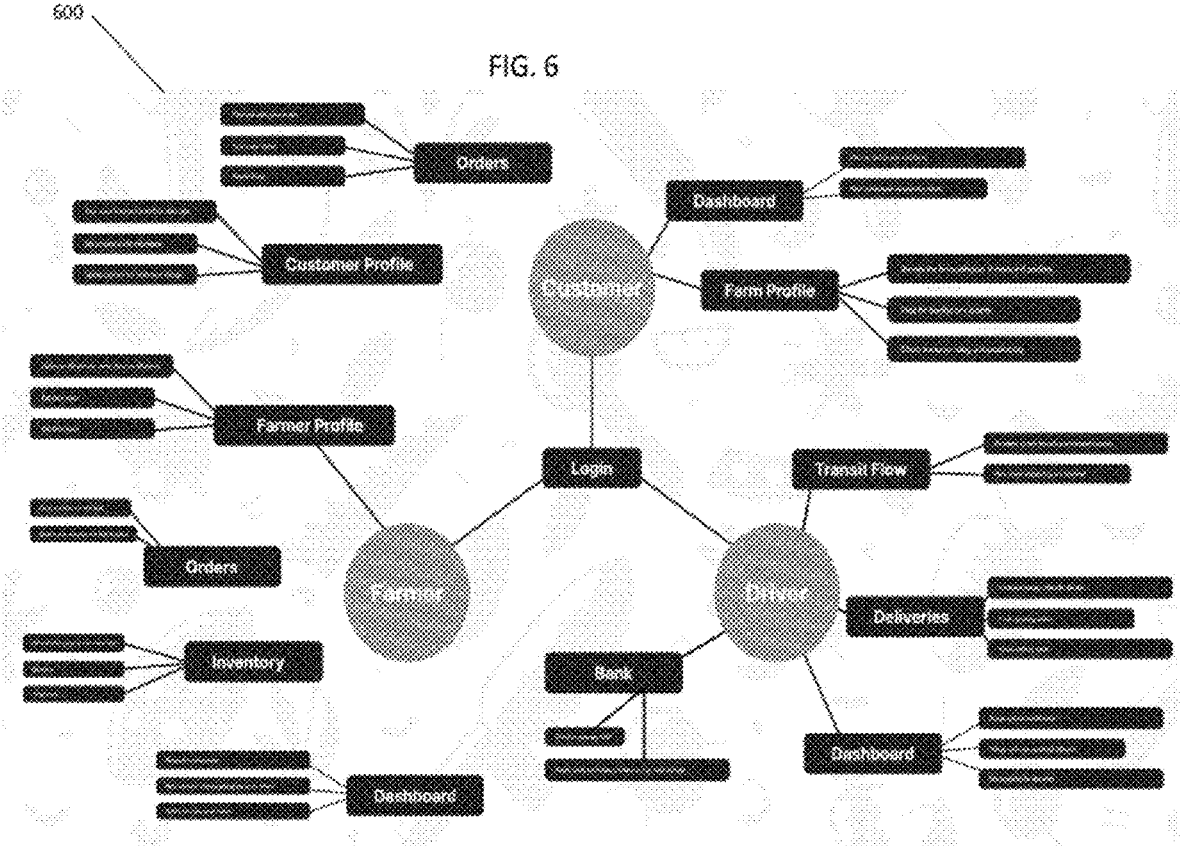
FIG. 6 is a block diagram of workflow 600 for a farmer inventory management system, according to an embodiment.

FIG. 6 is a block diagram of workflow 600 for a farmer inventory management system. The login interface is configured for profile registration by a customer, a farmer, and a driver.

Figure 7:
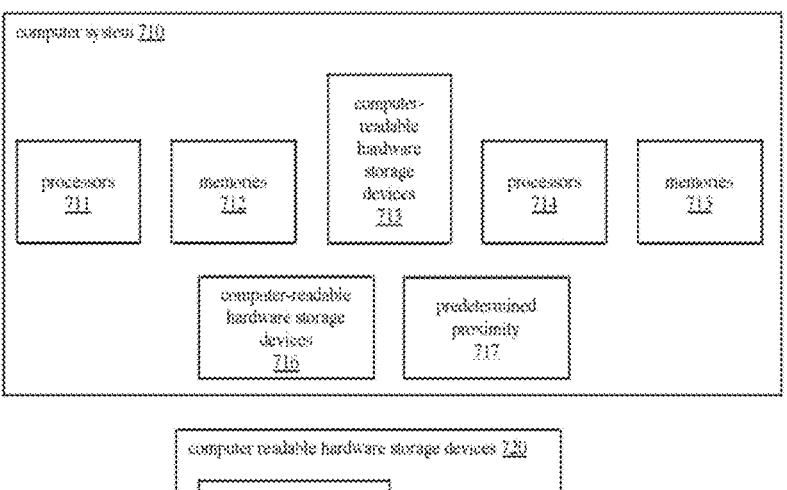
FIG. 7 is a block diagram illustrating a computer system, according to some embodiments of the present disclosure.
Figure 7:
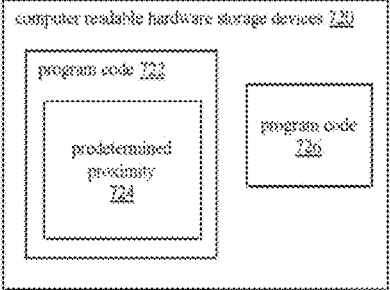

FIG. 7 is a block diagram that describes a method of order fulfillment including providing computer system 710, according to some embodiments of the present disclosure. In some embodiments, the computer system 710 may include one or more processors 711, one or more memories 712, one or more computer-readable hardware storage devices 713, one or more processors 714, one or more memories 715, one or more computer-readable hardware storage devices 716, and a predetermined proximity 717 to the farm.

In some embodiments, providing a menu of items, by a farm. Providing a quick-response (QR) code. Providing one or more products from the farm. Packaging the one or more products from the farm. Affixing the QR code to the packaging. Scanning the QR code of the packaging to add the one or more products to an inventory system. Selecting a farm, by a user. Receiving a request for an order. The one or more products from the farm.

In some embodiments, assigning the order to a driver. Displaying to the driver data associated with the order. The one or more computer readable hardware storage devices 720 may include program code 726 executable by the one or more processors 714 via the one or more memories 715 to implement a farm-to-table delivery platform. The one or more computer readable hardware storage devices 720 may also include program code 722 executable by the one or more processors 711 via the one or more memories 712 to implement a method for providing a farm-to-table delivery platform, the method.

In some embodiments, the program code 722 may include a predetermined proximity 724 to the farm. Providing a menu of items, by a farm. Providing a quick-response (QR) code. Providing one or more products from the farm. Packaging the one or more products from the farm. Affixing the QR code to the packaging. Scanning the QR code of the packaging to add the one or more products to an inventory system. Selecting a farm, by a user. Receiving a request for an order. The one or more products from the farm. Assigning the order to a driver. Displaying to the driver data associated with the order.

Figure 8:
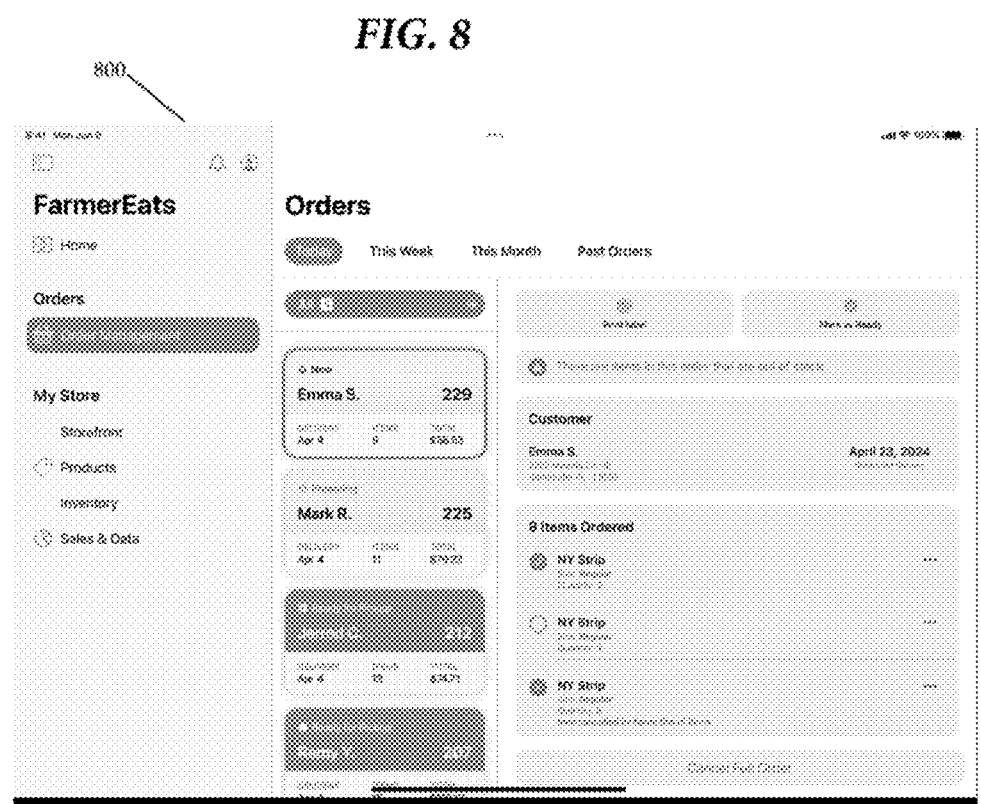
FIG. 8 is an illustration of a device showing an operational sequence, for operational management of a new user, that may be performed when running the farm-to-table delivery app, according to an embodiment.

FIG. 8 illustrates an operational sequence 800 for managing operations within a farm-to-table delivery application. The sequence is displayed on an electronic device with a graphical user interface (GUI). An electronic device refers to a computing device, such as a smartphone, tablet, and/or a computer, that has a processor and a display for running software applications. In an embodiment, various functionalities are available to a user, such as order management, tracking, and status updates. The display includes categorized orders ("New," "Preparing," "Ready for Pickup") and details of a specific order, including customer information, delivery schedule, and item status. Notably, the GUI alerts the user about out-of-stock items, offering options like printing labels, marking orders as ready, or canceling the entire order.

Figure 9:
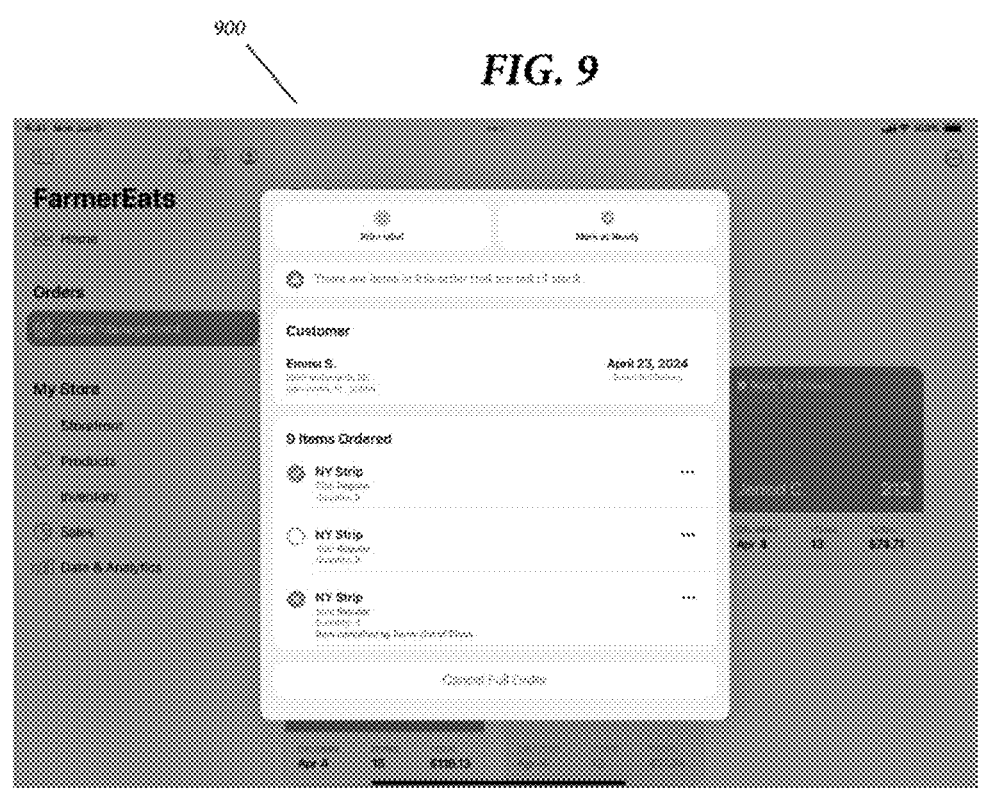
FIG. 9 is an illustration of a device showing an operational sequence, for operational management of the new user of FIG. 8, that may be performed when running the farm-to-table delivery app, according to an embodiment.

FIG. 9 illustrates an operational sequence 900 for managing operations within a farm-to-table delivery application on an electronic device with the GUI. The display presents to a user a detailed view of an order associated with a specific customer. It provides functionalities such as printing a label and marking the order as ready. The interface displays an alert indicating that certain items in the order are out of stock. The order details include customer information, delivery date, and a breakdown of the items ordered. Each item is marked with a status indicator: available items are marked as ready, while out-of-stock items are flagged with a warning and labeled as "canceled by farm." Additionally, the GUI offers the user the option to cancel the full order. This sequence emphasizes efficient order management by visually organizing details and alerting users to potential issues in fulfilling orders.

Figure 10:
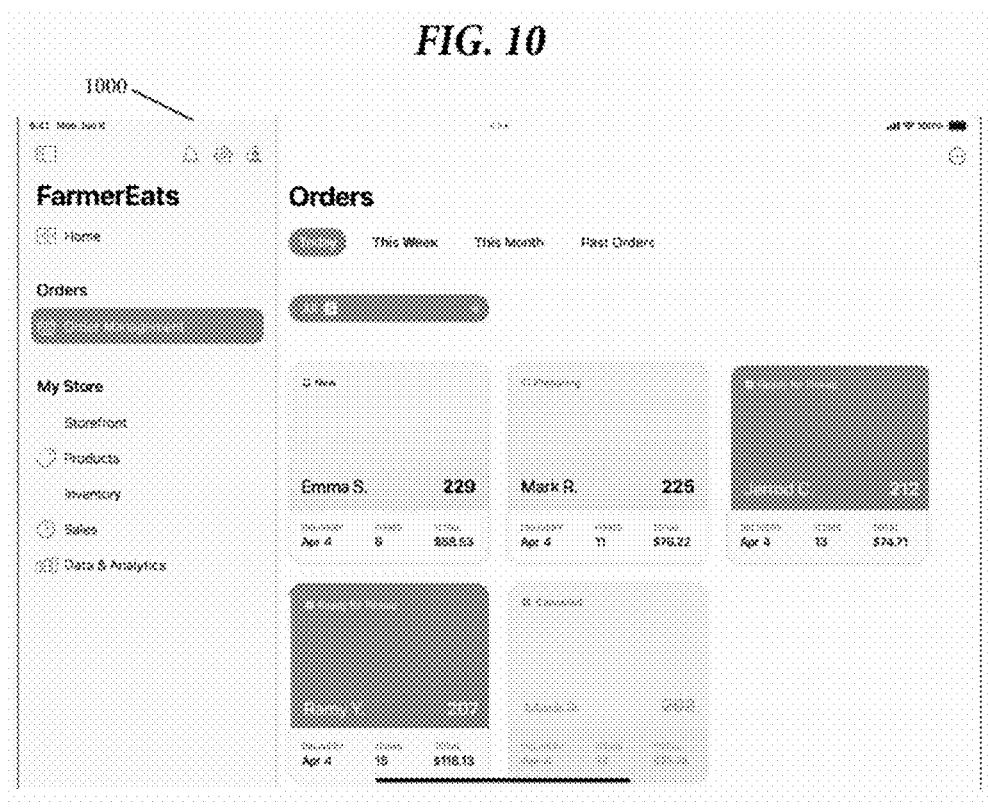
FIG. 10 is an illustration of a device showing an operational sequence, for operational management of all orders, that may be performed when running the farm-to-table delivery app, according to an embodiment.

FIG. 10 depicts an operational sequence 1000 for managing orders within a farm-to-table delivery application using an electronic device with the GUI. The interface organizes orders into categorized cards based on their status: "New," "Preparing," "Ready for Pickup," and "Cancelled." Each order card displays essential details, including the customer's name, order number, delivery date, item count, and total price. The left-hand navigation panel provides quick access to sections, such as "Storefront," "Products," "Inventory," "Sales," and "Data & Analytics." Above the order statuses, filters allow users to view orders by specific timeframes, such as "Today," "This Week," and "This Month." A drop-down menu further refines the display to focus on particular order types. The layout is configured for efficient management, enabling users to prioritize tasks such as preparing orders for delivery or addressing cancellations. The use of color-coded cards enhances readability, helping users quickly identify the status of each order and act accordingly.

Figure 11:
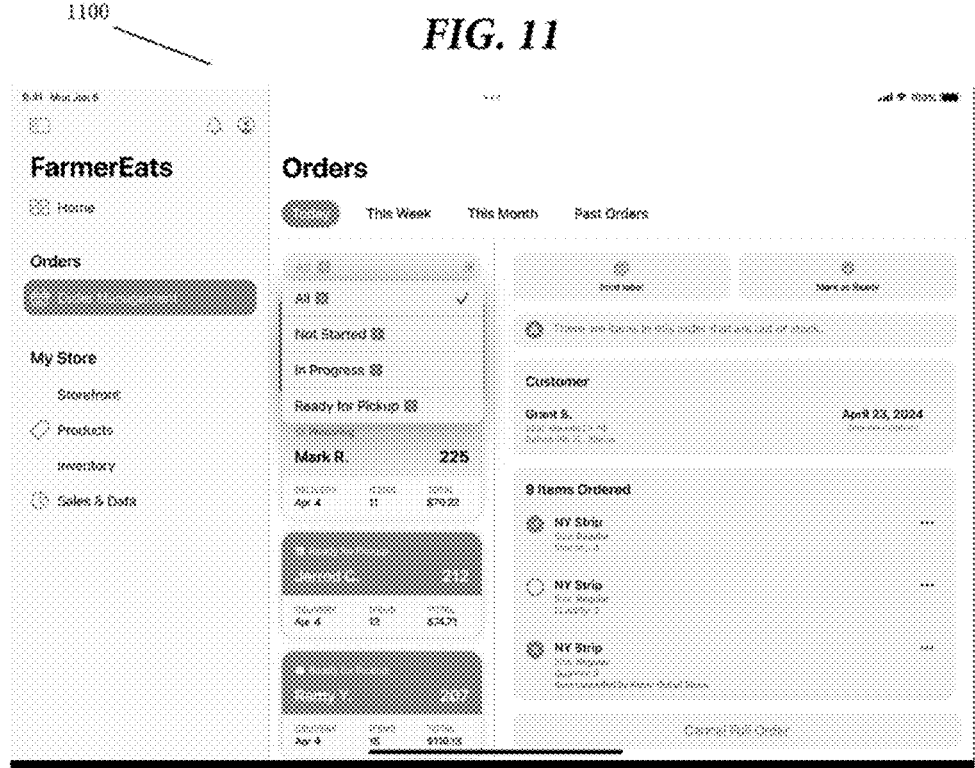
FIG. 11 is an illustration of a device showing an operational sequence, for operational management of all orders of FIG. 10 with a filter applied, that may be performed when running the farm-to-table delivery app, according to an embodiment.

FIG. 11 illustrates a device displaying an operational sequence 1100 for managing all orders in the farm-to-table delivery application with a filter applied. The filter functionality allows users to streamline the display of orders by selecting specific categories such as "All," "Not Started," "In Progress," and "Ready for Pickup." This feature is configured to help users efficiently manage orders by focusing on their current status. For example, selecting the "Not Started" filter displays only orders that have yet to be processed, such as new orders waiting for preparation. The "In Progress" filter highlights orders actively being prepared or packed for delivery, enabling users to monitor ongoing operations. The "Ready for Pickup" filter showcases completed orders that are awaiting customer collection, such as an order for Jerrod C. marked as ready with 13 items totaling $74.71. The GUI maintains a clean and intuitive layout, with order details displayed on color-coded cards for quick identification. Bach card includes customer information, order numbers, item counts, and totals, making it easy for users to track and manage multiple orders. The filtering system enhances operational efficiency by allowing users to focus on specific subsets of orders, reducing clutter and streamlining task prioritization.

Figure 12:
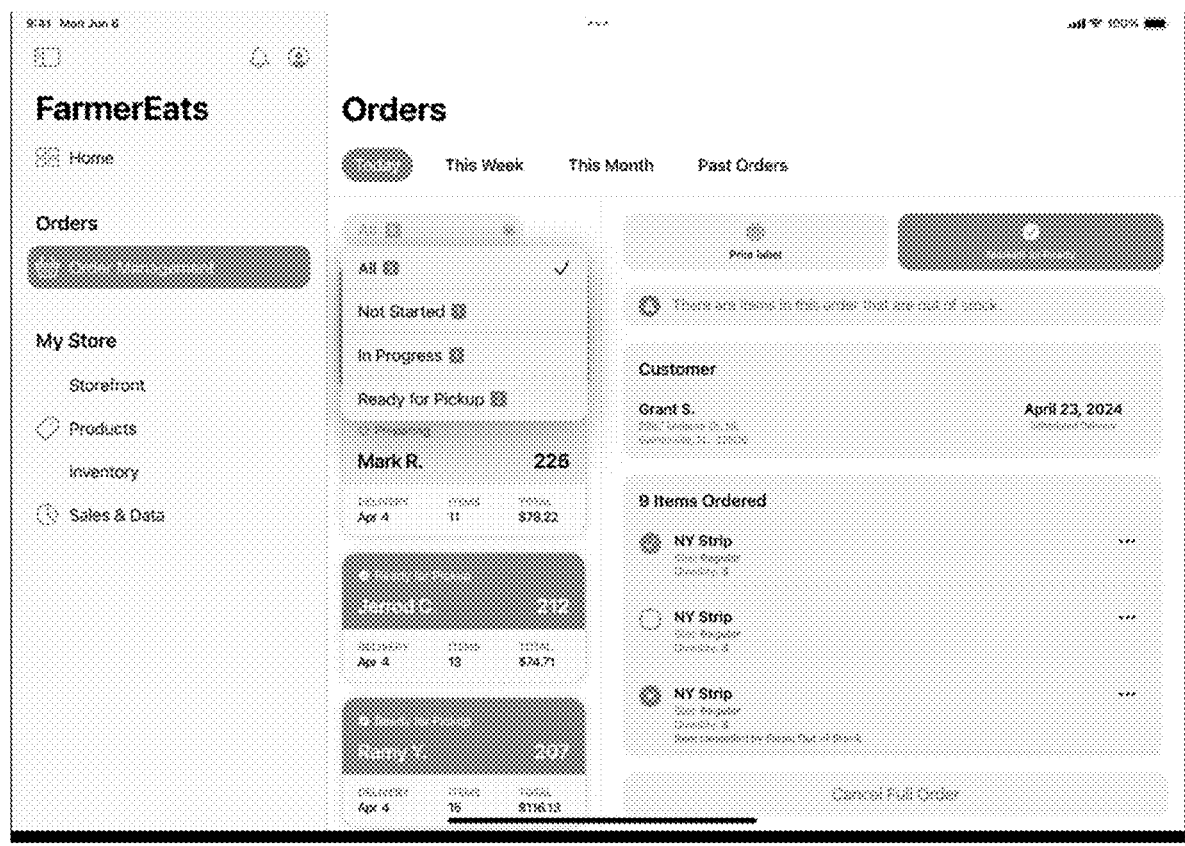
FIG. 12 is an illustration of a device showing an operational sequence, for operational management of all orders of FIG. 10 with a filter applied and marked as ready, that may be performed when running the farm-to-table delivery app, according to an embodiment.

FIG. 12 illustrates a device displaying an operational sequence 1200, showcasing the management of all orders from FIG. 10 with a filter applied and an order marked as "Ready." This sequence demonstrates the system's ability to refine the order display and manage workflow transitions efficiently. When a user selects a filter, such as "Ready for Pickup," only those orders that have been prepared and are waiting for customer collection are shown. For instance, in this filtered view, orders such as Ramy Y.'s are displayed with clear details, including the delivery date, the number of items (e.g., 15 items), and the total cost ($116.13). Once an order is reviewed and confirmed to be complete, it can be marked as "Ready," as indicated by the green status badge on the corresponding order card. This status change ensures that both staff and customers are informed in real-time about the order's readiness for pickup. Additionally, this operational sequence includes actionable buttons or options that allow users to perform tasks such as printing labels, notifying customers, or making adjustments if necessary. The system's layout ensures that order information remains accessible, with color-coded indicators simplifying the identification of statuses. By marking orders as "Ready," the application streamlines the handoff process, ensuring accuracy and enhancing the customer experience in farm-to-table operations.

Figure 13:
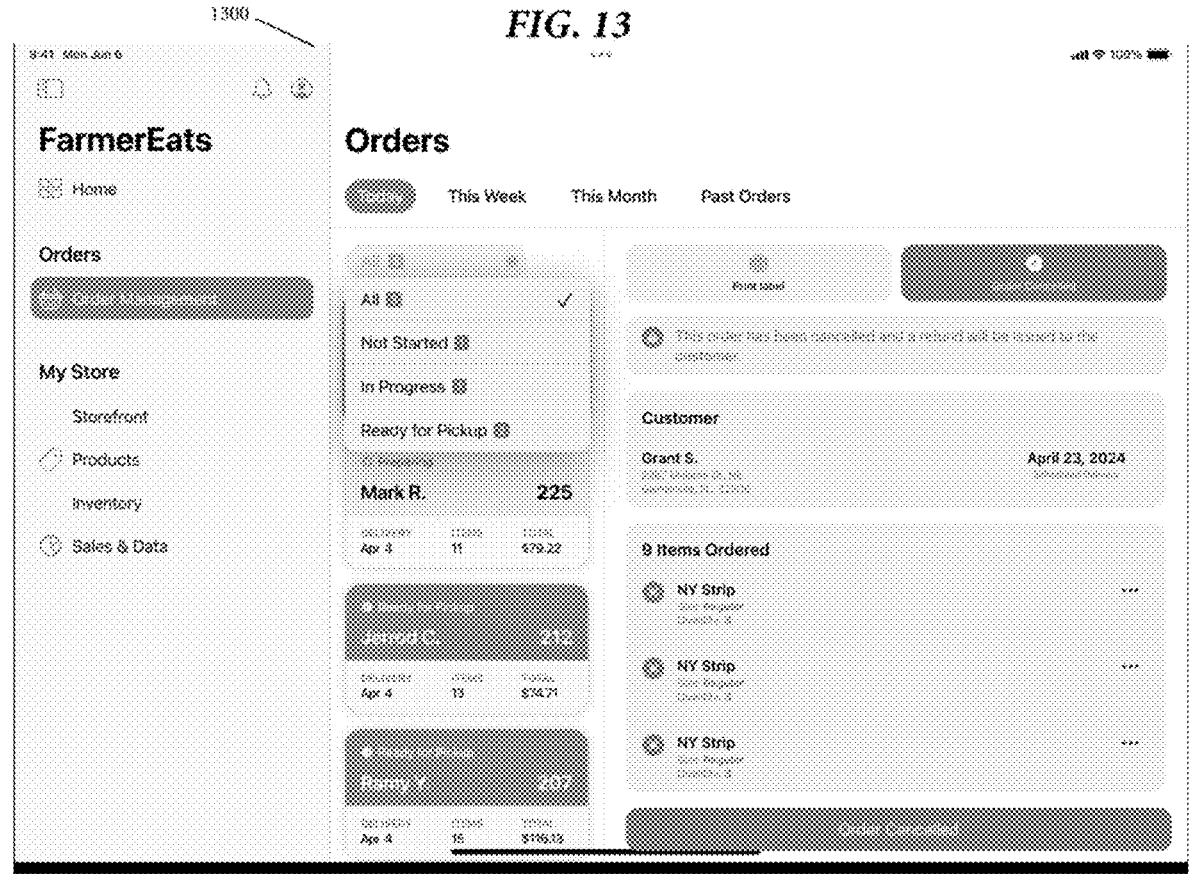
FIG. 13 is an illustration of a device showing an operational sequence, for operational management of all orders of FIG. 10 with a filter applied and the order canceled, that may be performed when running the farm-to-table delivery app, according to an embodiment.

FIG. 13 illustrates a device displaying an operational sequence 1300, configured to manage all orders from FIG. 10 with a filter applied to highlight canceled orders. This sequence focuses on handling orders that have been canceled, ensuring that appropriate follow-up actions, such as issuing refunds, are carried out effectively. When the "Canceled" filter is selected, the system provides a streamlined view of all orders with this status, allowing staff to focus specifically on resolving these cases. For example, the canceled order for Mark R. might indicate that the order included unavailable items or was canceled by the customer before fulfillment. The order card displays the order details, such as the delivery date, number of items (e.g., 12), and the total refund amount (e.g., $87.14). A notification system could alert the staff that the refund process has been initiated, ensuring transparency and customer satisfaction, The interface may also include options for additional actions, such as viewing the reason for cancellation, generating a cancellation confirmation for the customer, or documenting the resolution steps taken. A red status indicator clearly marks the canceled orders, distinguishing them from other order statuses, and providing clarity for operational staff. This operational sequence not only simplifies the management of canceled orders but also enhances customer service by ensuring refunds are processed promptly and efficiently.

Figure 14:
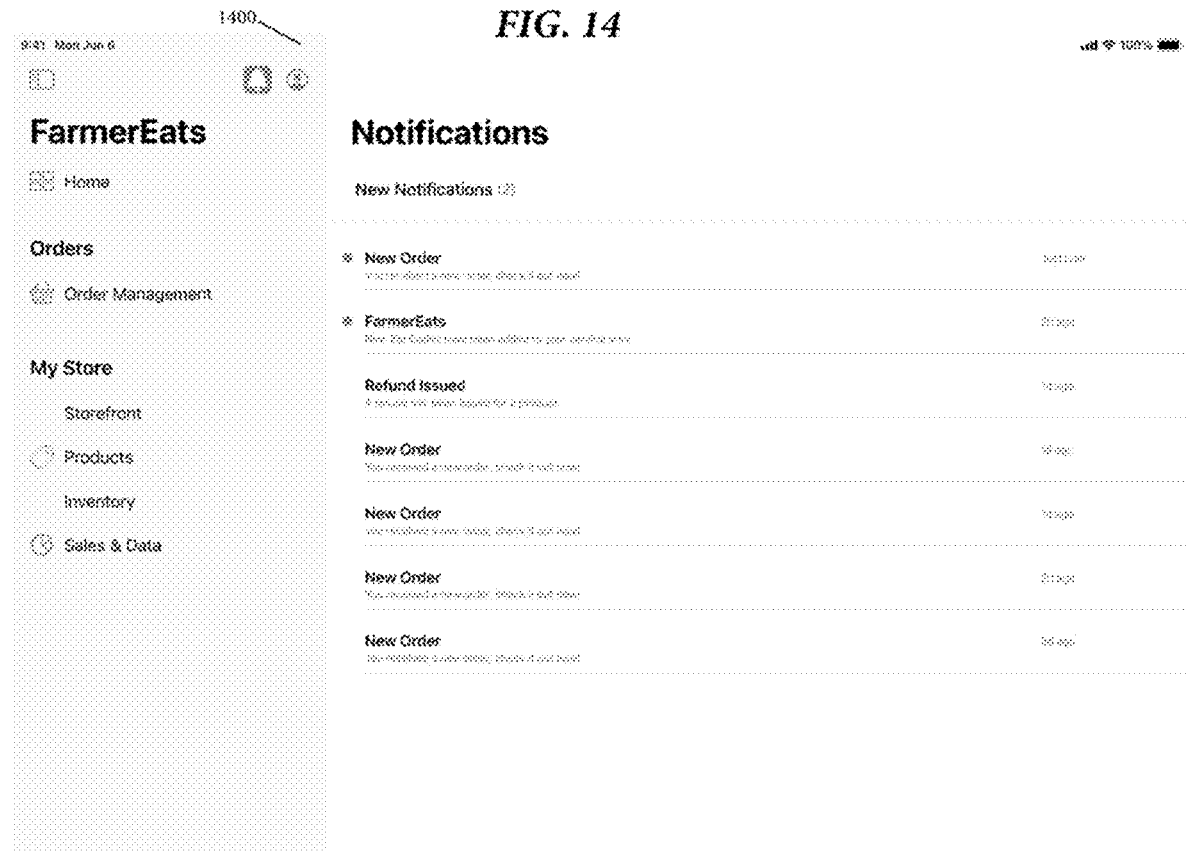
FIG. 14 is an illustration of a device showing an operational sequence, within the FarmerEats application, in which a notification listing may be displayed to a user when running the farm-to-table delivery app, according to an embodiment.

FIG. 14 illustrates an electronic device displaying an operational sequence 1400 within the FarmerEats application, with a notifications panel. In an example, the interface is divided into two main sections. On the left, a navigation menu provides access to various features of the application, including "Home" for the central dashboard, "Orders" with a sub-menu for "Order Management," and "My Store," which includes options for "Storefront," "Products," "Inventory," and "Sales & Data." This menu allows users to access different functionalities related to managing their farm operations. On the right, a detailed notifications list is displayed, highlighting updates such as new orders, issued refunds, and changes to service areas. Each notification includes a timestamp, providing the user with contextual information about when the event occurred. The configuration demonstrates an intuitive layout, enabling access to real-time updates and streamlined navigation for managing sales, inventory, and customer interactions.

Figure 15:
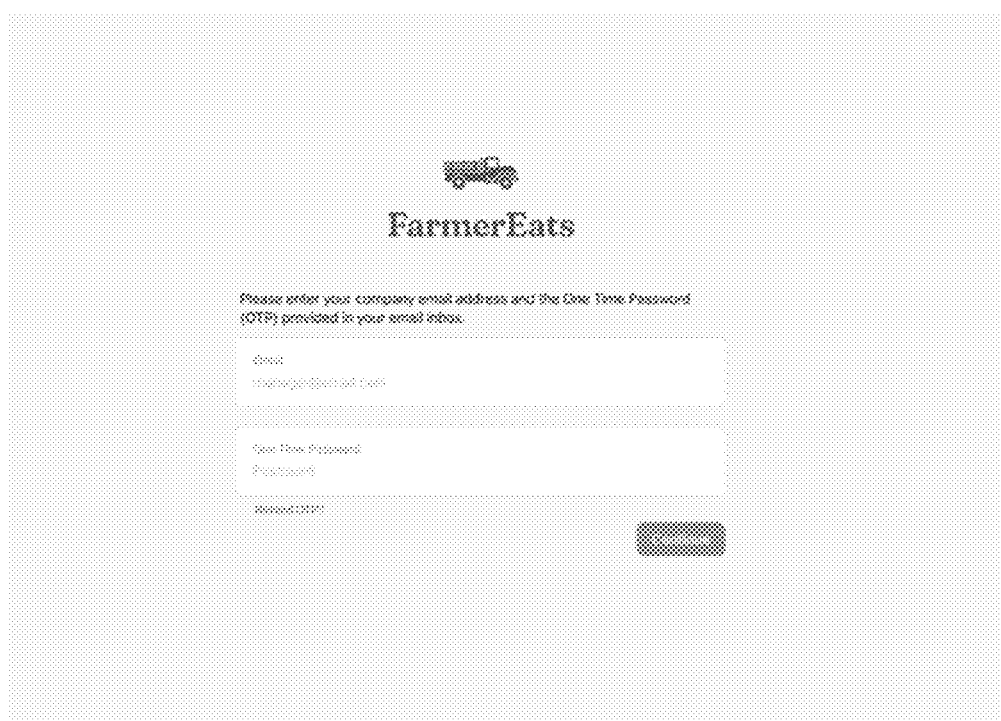
FIG. 15 is an illustration of a device showing an operational sequence, within the FarmerEats administration platform, for new administrator sign up when running the farm-to-table delivery app, according to an embodiment.

FIG. 15 illustrates an operational sequence 1500 within the FarmerEats administration platform, showcasing a secure login screen for accessing the farm-to-table delivery app's dashboard. The interface features at the top of the screen, the FarmerEats logo, depicted as a truck icon, reinforcing the brand identity and communicates the platform's purpose. The login process requires users, such as administrators or farm managers, to enter a registered company email address and a One-Time Password (OTP), which is sent to their email. This two-step authentication method enhances security, ensuring that only authorized users can access sensitive information, such as order details, inventory management, and delivery data.

Clear instructions guide the user through the login process, explaining the need to check their email for the OTP. A "Resend OTP" option is provided, allowing users to request a new code in case of delays or errors. The text fields for email and password are well-organized, with the "Continue" button grayed out until valid inputs are detected, preventing incomplete submissions. The screen's minimalist white background, paired with green accents, aligns with the FarmerBats branding and draws attention to actionable elements, such as the "Resend OTP" link. This login interface acts as the gateway to the administration platform's dashboard, enabling users to manage one or more operations like orders, inventory, and sales. It underscores the importance of secure access in ensuring smooth and trustworthy farm-to-table operations.

Figure 16:
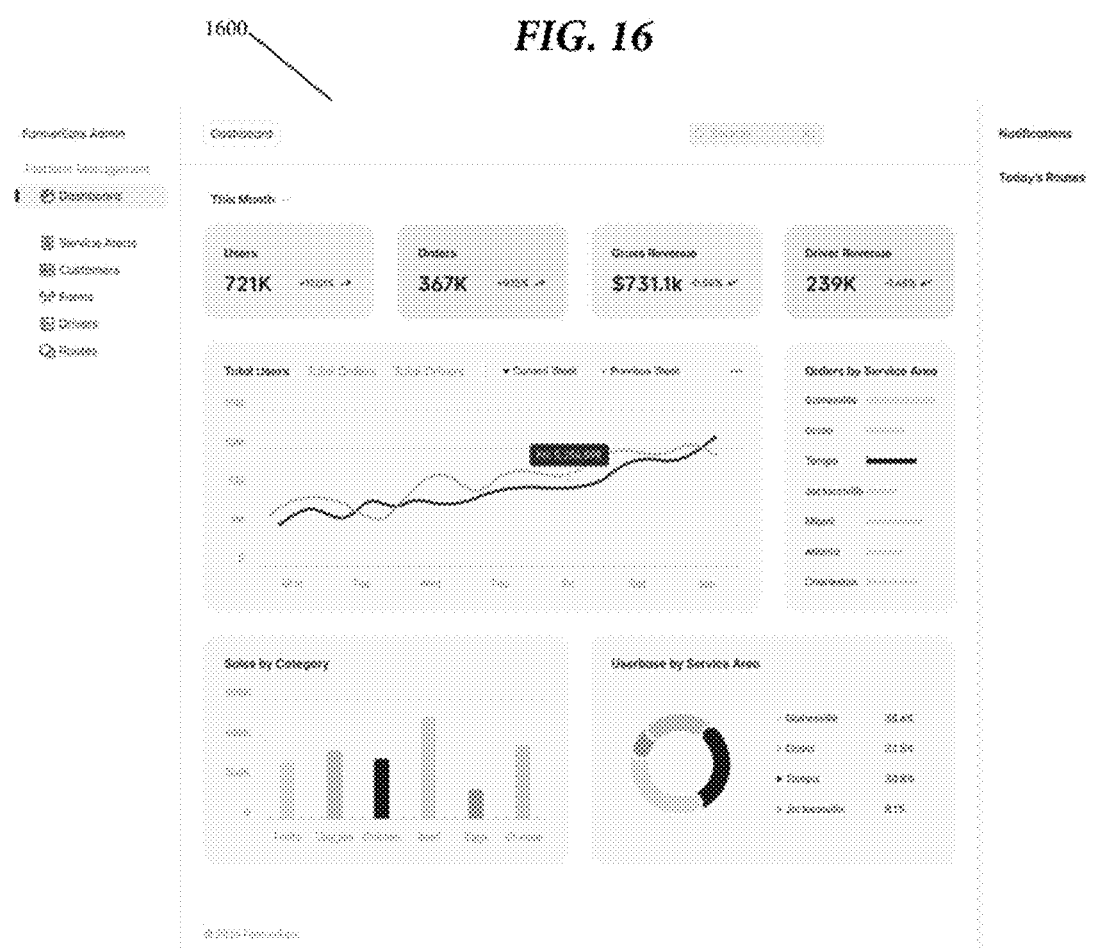
FIG. 16 is an illustration of a device showing an operational sequence, within the FarmerEats administration platform, employing a dashboard when running the farm-to-table delivery app, according to an embodiment.

FIG. 16 illustrates an operational sequence 1600 within the FarmerEats administration platform, with a dynamic dashboard that provides an in-depth overview of metrics for managing the farm-to-table delivery service. The dashboard is configured to support data-driven decision-making, displaying real-time insights on user activity, orders, revenue, and operational trends. At the top, key performance indicators summarize monthly metrics, including 721,000 users with a +10.11% increase, 367,000 orders with a +9.15% growth, gross revenue of $731,100 reflecting a −0.56% dip, and driver revenue of $239,000 showing a slight −1.48% decline. These metrics offer an overview of the platform's overall performance.

Beneath these summaries, interactive visualizations further break down the data. A line chart compares weekly trends for total users, orders, and drivers, highlighting specific data points like Friday's activity peak of 5,256,598 users. Complementing this, bar charts categorize sales by product type, such as fruits, vegetables, chicken, beef, eggs, and cheese, helping administrators identify high-demand categories and optimize inventory or marketing strategies. Regional performance insights are presented through a bar graph showing orders by service areas such as Tampa, Gainesville, Ocala, and Jacksonville, with Tampa emerging as a key market. A pie chart details user distribution by region, with Gainesville accounting for 38.6% of the user base, followed by Tampa with 30.8%, Ocala with 22.5%, and Jacksonville with 8.1%.

The platform's user-centered design includes a navigation menu on the left, offering access to modules such as service areas, customers, farms, drivers, and routes, A search bar at the top enhances functionality by enabling quick access to specific data, while a notifications panel on the right provides updates, such as details on today's delivery routes, ensuring administrators remain informed of ongoing operations. Color-coded indicators further highlight trends or variances, directing attention to areas needing further analysis. This dashboard serves as a central control hub for FarmerEats, empowering administrators to monitor and optimize many facets of the farm-to-table delivery process. It streamlines logistics by offering actionable insights into orders and routes, aids revenue management by tracking gross and driver earnings, and supports customer engagement through regional data analysis. By consolidating complex information into user-friendly visualizations, the dashboard demonstrates FarmerEats' commitment to leveraging technology for efficient and sustainable operations.

Figure 17:
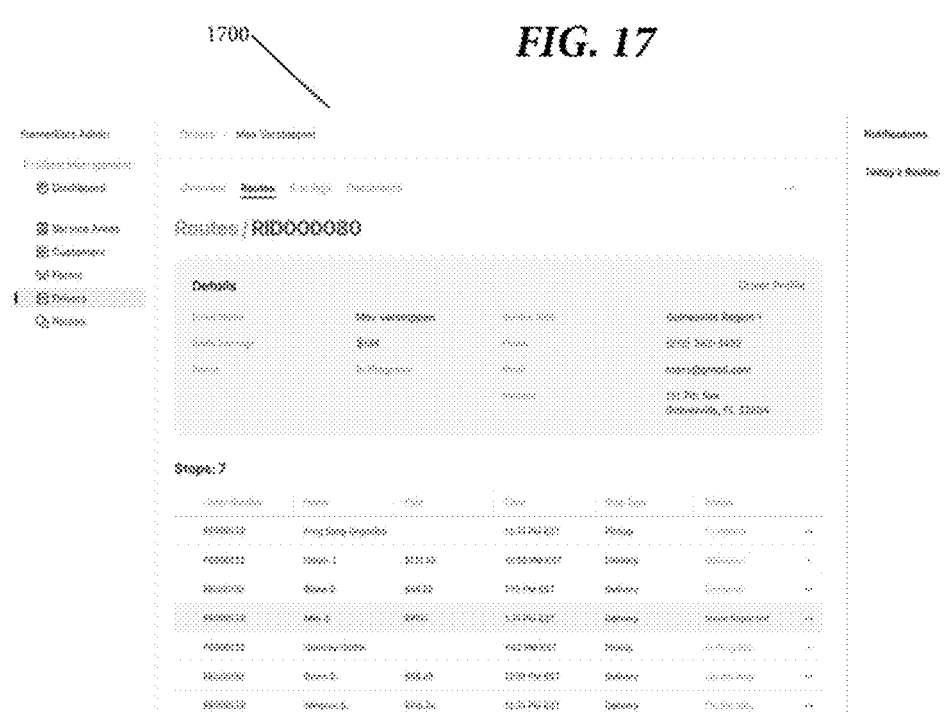
FIG. 17 is an illustration of a device showing an operational sequence, within the FarmerEats administration platform, for a driver route listing when running the farm-to-table delivery app, according to an embodiment.

FIG. 17 provides a detailed illustration of an operational sequence 1700 within the FarmerEats administration platform, showing a driver route listing interface configured to streamline the management of farm-to-table delivery operations. This embodiment presents a layout that displays information about each delivery stop, enabling drivers and administrators to track and manage orders in real time. The interface includes multiple data fields, such as order numbers, customer names, payment methods, estimated delivery times, stop types, and order statuses, ensuring comprehensive oversight of the delivery process. For instance, each row in the listing might represent a unique delivery stop, identified by an order number (e.g., #12345) and associated with the customer's name (e.g., John Doe). The payment column provides details on the method of payment used, such as "Credit Card," "Cash," or "Online Wallet," allowing the driver to confirm payment arrangements before or during the delivery. The estimated delivery time is displayed to ensure timely service, with entries like "2:30 PM" or "5:15 PM" guiding the driver's schedule. Additionally, the stop type specifies the nature of the delivery, such as "Farm Pickup," "Residential Delivery," or "Business Drop-off," helping drivers prepare for specific requirements at each location.

The status column is particularly useful for real-time updates, reflecting the current progress of each order. Examples of statuses include "Pending," "En Route," "Delivered," or "Canceled," with color-coded indicators—such as green for completed deliveries and red for canceled stops—enhancing visual clarity. For instance, an order marked as "Pending" with an estimated time of "1:45 PM" might indicate that the driver should prioritize this stop to stay on schedule.

Additional functionality might include interactive features, such as the ability to filter or sort stops by time, status, or location, helping drivers optimize their routes. For example, a driver could sort the list to group all "Residential Deliveries" together or prioritize stops marked as "En Route" for immediate action. The platform could also integrate mapping features, allowing drivers to click on a stop to view its location on a digital map, complete with turn-by-turn navigation. In an embodiment, the driver route listing is configured to accommodate the complexities of farm-to-table logistics, providing real-time visibility into multiple variables that affect delivery efficiency. By offering detailed and actionable information, this operational sequence within the FarmerEats administration platform enhances both driver productivity and customer satisfaction, ensuring that fresh produce and other goods are delivered promptly and accurately.

Figure 18:
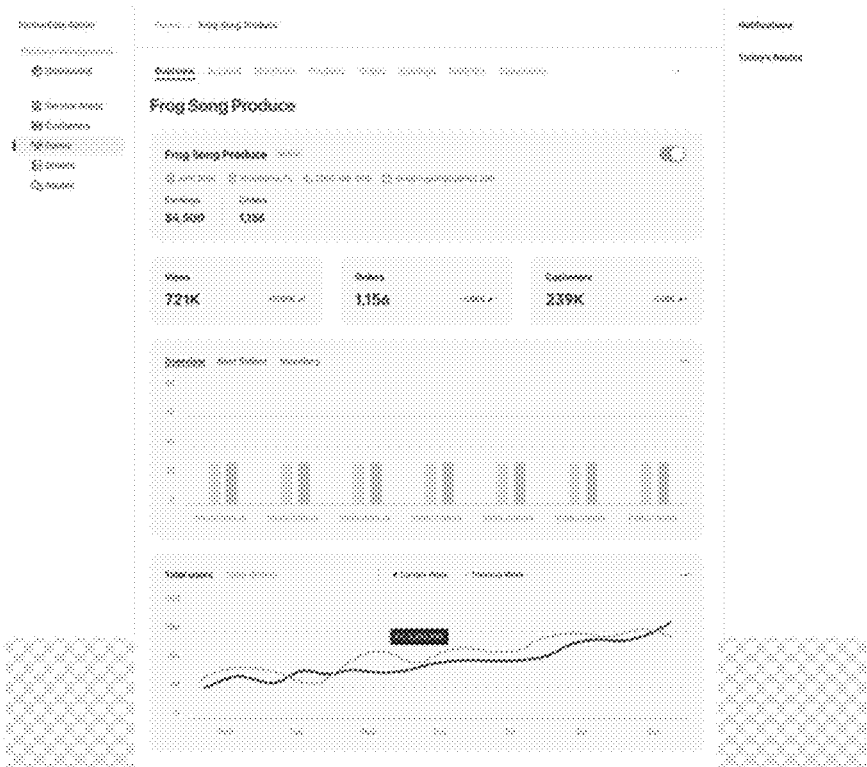
FIG. 18 is an illustration of a device showing an operational sequence, within the FarmerEats administration platform, for a Farm listing when running the farm-to-table delivery app, according to an embodiment.

FIG. 18 illustrates an operational sequence 1800 within the FarmerEats administration platform, specifically show-casing a Farm Listing interface configured to provide comprehensive oversight and management of individual farms participating in the farm-to-table delivery ecosystem. This embodiment presents a centralized dashboard that organizes farm-related information into various tabs, including Overview, Account, Storefront, Products, Orders, Earnings, Analytics, and Statements. This design facilitates access to detailed farmer data for users such as administrators, farmers, and delivery coordinators.

The Overview tab acts as a high-level summary, presenting key details about each farm. For instance, it might display the farm's name (e.g., Green Valley Farms), location, operational status (e.g., "Active" or "Inactive"), and contact information for the farm manager. It could also provide real-time metrics such as the number of active products, recent orders, and total earnings within a specified time period. The Account tab delves deeper into the farm's profile and administrative settings. This section might include details such as registration information, licensing documentation, and payment preferences (e.g., linked bank accounts or payment thresholds). It could also allow updates to contact information or settings, ensuring the farm's profile remains accurate and current.

The Storefront tab provides tools for customizing the farm's digital presence within the FarmerEats platform. Farmers could upload high-quality images of their farm or products, write engaging descriptions, and set promotional banners to attract customers. For example, Green Valley Farms might feature a "Seasonal Special" banner showcasing its fresh organic strawberries. The Products tab offers a detailed inventory management system. Farmers can list their products, including details such as name, description, quantity, price, and availability status. For example, the farm could list "Organic Free-Range Eggs" at $4.99 per dozen, with an available stock of 120 units. Farmers might also upload photos of their products and set discount pricing for bulk orders.

The Orders tab allows farmers to track customer orders in real time. Each order entry might display an order ID, customer name, product details, quantity, total price, and delivery status (e.g., "Pending," "In Progress," "Completed"). For example, an order for 20 pounds of organic carrots from Green Valley Farms might show as "Pending," with a delivery time of 3:00 PM scheduled for the next day. The Earnings tab provides a breakdown of revenue streams, allowing farmers to monitor their financial performance. It could include graphs and charts showcasing daily, weekly, or monthly earnings, as well as insights into top-performing products or peak sales periods. For instance, farmers might notice a revenue spike in June due to high demand for fresh summer produce. The Analytics tab offers data-driven insights, helping farmers optimize their operations. This section might display metrics such as customer demographics, average order value, seasonal trends, and product popularity. For example, a farmer might discover that "Fresh Basil Bunches" consistently sell out on weekends, prompting them to increase production to meet demand.

Lastly, the Statements tab centralizes all financial records, including invoices, payment summaries, and tax documents. Farmers can download monthly earnings statements, review transaction histories, and track pending payouts. For instance, a farmer might access their August earnings statement to verify a payment of $1,200 received for completed orders. This Farm Listing interface within the FarmerEats administration platform exemplifies a toolset for farmers to manage their operations with precision and transparency. By integrating diverse functionalities, the platform not only streamlines the administrative workload for farmers but also enhances their ability to engage with customers, boost sales, and optimize their contributions to the farm-to-table delivery network.

Figure 19:
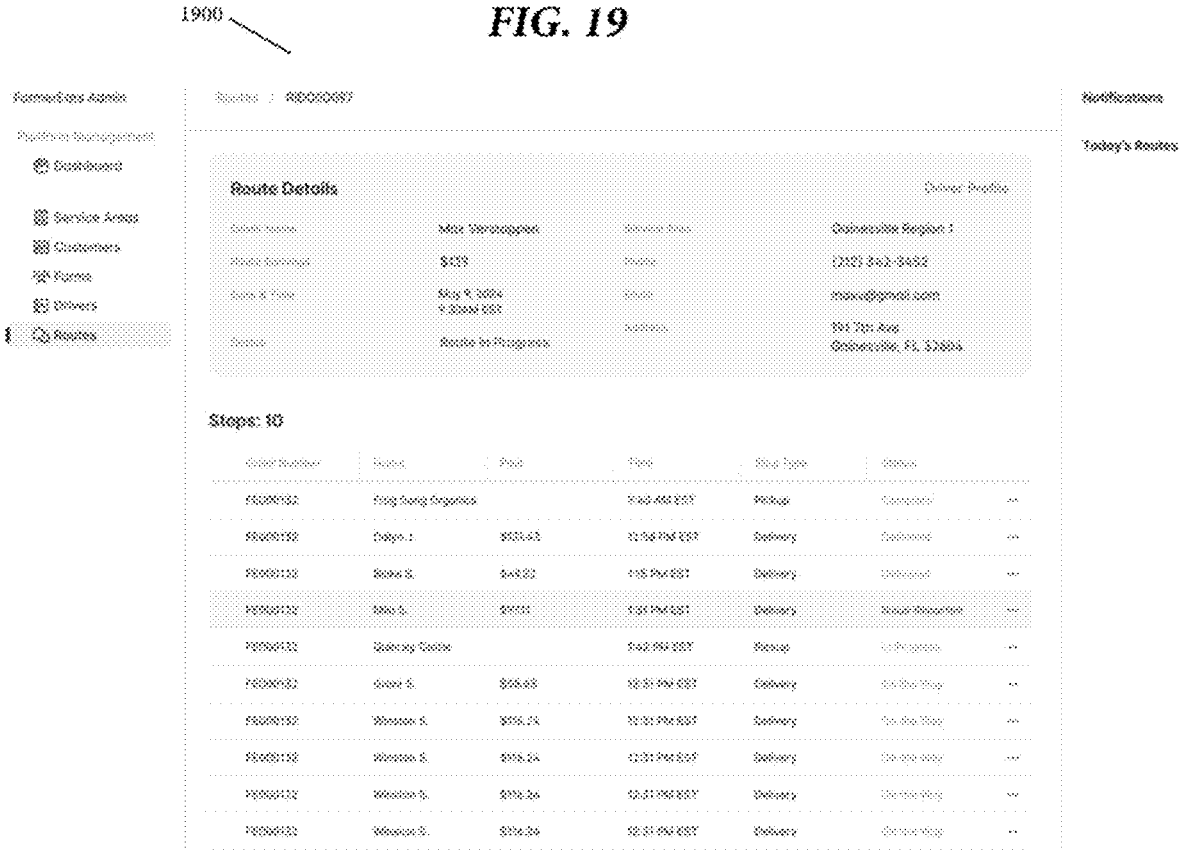
FIG. 19 is an illustration of a device showing an operational sequence, within the FarmerEats administration platform, for a route listing when running the farm-to-table delivery app, according to an embodiment.

FIG. 19 is an illustration of an operational sequence 1900 within the FarmerEats administration platform, depicting a Route Listing interface used for managing delivery routes in the farm-to-table delivery app. This embodiment shows an example layout configured to streamline route management, providing users, such as platform administrators and/or logistics coordinators, with a comprehensive view of route-specific information. The interface displays a Driver Profile, which includes details about the driver assigned to the route. For example, it might show the driver's name, such as John Doe, alongside a profile picture for quick identification. Additional details include Route Earnings, indicating the driver's total earnings for completing the route—for instance, "$250 for the day." The Date and Time field specifies when the route was scheduled or completed, such as "Nov. 30, 2024, at 9:00 AM." The Status field provides real-time updates, showing whether the route is In Progress, Pending, or Completed, allowing administrators to monitor delivery progress at a glance.

Other driver-related information includes the Service Areas the route covers. For instance, a route might span Tampa, Orlando, and surrounding suburbs. The platform also provides the driver's contact information, including Phone Number (e.g., "555-123-4567") and Email (e.g., "john.doe@farmereats.com"), enabling quick communication for updates or emergencies. The driver's Address may also be listed for administrative purposes or route planning. In addition to driver details, the Route Listing interface organizes and displays information about the orders associated with the route. Each Order Number is linked to a specific delivery stop, allowing users to track the movement of goods efficiently. For example, an order numbered #10245 might indicate a stop at Green Acres Organic Store to deliver 20 pounds of fresh kale. Each stop entry might include details such as the recipient's name, address, phone number, and special delivery instructions (e.g., "Leave by the side door").

Stops along the route are displayed in a logical sequence to ensure optimal delivery efficiency. For instance, the interface could show a route starting at Tampa's downtown area and moving outward to suburban neighborhoods, minimizing travel time and fuel usage. This sequencing might be accompanied by a live map view or route visualization, enabling users to see the driver's current location in real-time. Furthermore, the interface may include a summary of Key Route Metrics to help users evaluate performance.

Metrics such as the total number of stops (e.g., "10 stops scheduled"), estimated route duration (e.g., "4 hours"), and total distance traveled (e.g., "120 miles") are presented to give a clear picture of the route's complexity and workload, For improved functionality, the system might allow users to adjust routes dynamically. For example, if a customer cancels an order or a driver encounters unexpected traffic, administrators can update the route in real-time and send notifications to the driver's mobile device. This Route Listing interface serves as a tool for maintaining efficiency and transparency in the FarmerEats delivery ecosystem. By organizing driver profiles, contact information, service area details, and order-specific stops into a single, intuitive display, the platform facilitates users to manage logistics for timely and accurate deliveries while optimizing operational resources.

Figure 20:
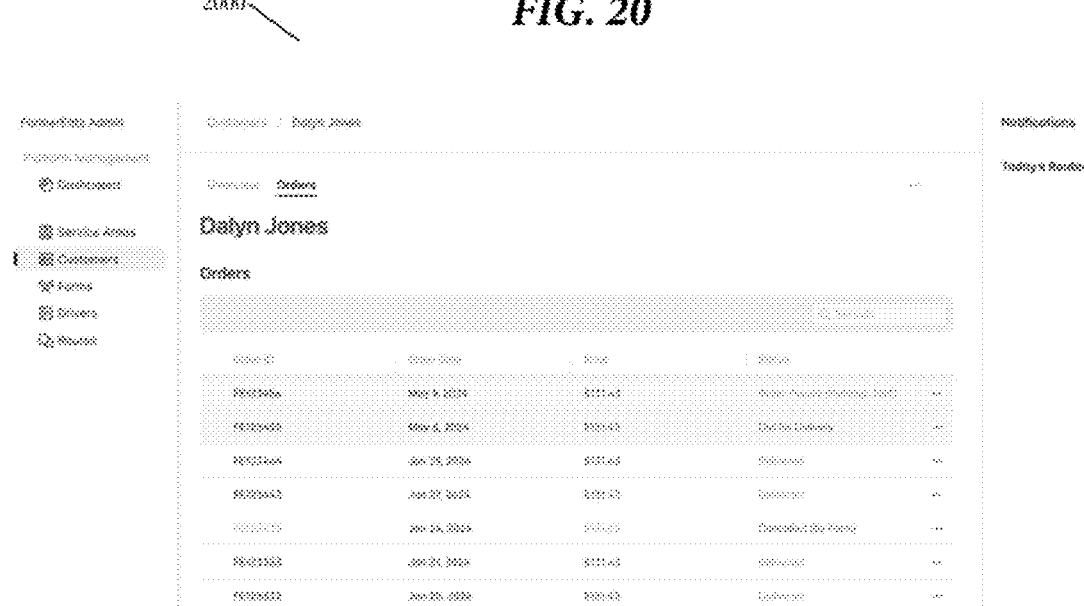
FIG. 20 is an illustration of a device showing an operational sequence, within the FarmerEats administration platform, for a customer listing when running the farm-to-table delivery app, according to an embodiment.

FIG. 20 illustrates an operational sequence 2000 within the FarmerEats administration platform, employing a Customer Listing interface configured to manage customer-related data for the farm-to-table delivery app. This embodiment demonstrates a layout that allows administrators to monitor and track customer orders. The Customer Overview section displays key information associated with each order, such as the unique Order ID, which serves as a reference for transactions, along with the Order Date to provide a clear timeline of activities. For example, an order might be identified as #34567 with a placement date of "Nov. 28, 2024." Additionally, the interface highlights the Price of each order, such as "$125.50," enabling administrators to easily verify payment details and reconcile earnings. The Order Status field provides real-time updates on the progress of each order, including statuses like Order Placed, indicating successful completion of the ordering process, Pending Configuration, which shows that fulfillment details are still being processed, Cancelled, reflecting voided orders due to issues like inventory shortages, and delivered, confirming the successful arrival of goods to the customer's location, complete with timestamps for verification.

The platform enhances usability by offering advanced filtering and search functionalities, enabling administrators to sort orders by various criteria such as date, status, or price range. For instance, users can quickly filter orders to display only pending or delivered transactions, streamlining the tracking of incomplete tasks. Furthermore, clicking on an Order ID provides access to detailed customer profiles, displaying relevant information such as the customer's name, contact details, delivery address, and a history of past orders. For example, a customer profile might reveal the name Emily Johnson, her contact number 555-987-6543, email address emily.johnson@example.com, and delivery address 123 Green Lane, Tampa, FL, along with a record of prior purchases and preferences, such as frequent orders of organic produce or seasonal bulk items, The interface also supports proactive issue management by flagging delayed orders with warning icons and offering features to send updates directly to customers, ensuring clear and timely communication. In addition to individual order tracking, the platform aggregates customer data to provide actionable insights. For instance, metrics such as a customer's total number of orders, lifetime spending, or average order value can be analyzed to identify high-value customers and support targeted marketing initiatives, such as promotional offers or loyalty rewards.

Figure 21:
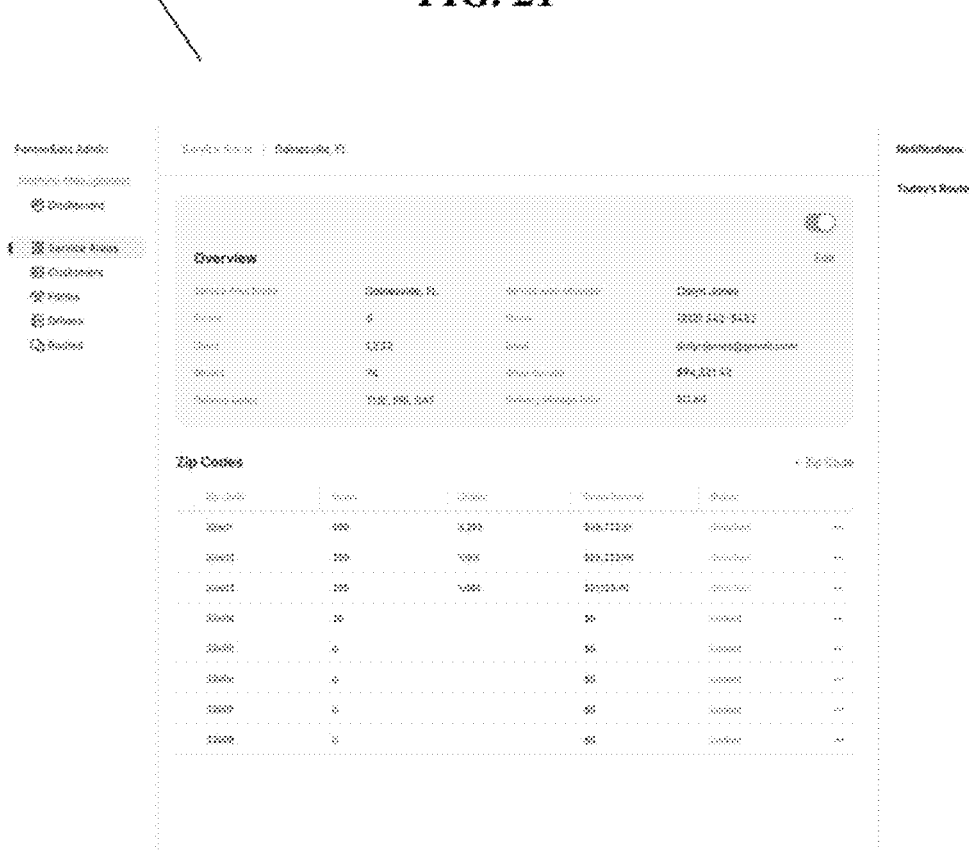
FIG. 21 is an illustration of a device showing an operational sequence, within the FarmerEats administration platform, for a service area listing when running the farm-to-table delivery app, according to an embodiment.

FIG. 21 illustrates an operational sequence 2100 within the FarmerEats administration platform, with a Service Area Listing interface tailored to manage and monitor regional operations for the farm-to-table delivery app. This embodiment presents an intuitive graphical user interface (GUI) that organizes and displays key details about each service area, ensuring administrators have complete visibility and control over regional activities. The interface includes a detailed overview of essential information, such as the Service Area Name, for example, "Tampa Bay," alongside associated data, such as the number of active Farms supplying produce, the number of registered Users receiving deliveries, the total number of Drivers assigned to the area, and upcoming or past Delivery Dates. This overview facilitates efficient planning and resource allocation for each service area.

Additionally, the platform provides information on the Service Area Manager, who oversees operations for the region. Details such as the manager's name, phone number, and email address are displayed—for instance, John Doe, 555-123-4567, John.Doc@example.com. This enables administrators to establish direct communication for updates, troubleshooting, or coordination. Metrics such as Gross Income generated within the service area and the applicable Delivery Mileage Rate are prominently displayed, allowing for detailed financial tracking. For example, a service area might show gross income of "$75,000" for the current month with a delivery mileage rate of "$1.25 per mile," which assists in evaluating operational profitability and adjusting pricing models.

The GUI also includes a breakdown of various zip codes covered by the service area, offering granular insights into delivery activities and user engagement. For each zip code, data points such as the User Value (e.g., total active users within a zip code), the number of Orders Placed, the corresponding Gross Income generated, and the Status of the zip code, whether it is Unlocked (available for new orders and users) and/or Locked (temporarily inactive). For instance, the zip code "33602" might show 450 active users, 1,200 orders placed, a gross income of "$12,500," and a status of Unlocked. In contrast, "33605" could reflect fewer users and be marked as Locked due to operational constraints such as driver shortages or farm supply limitations.

Figure 22:
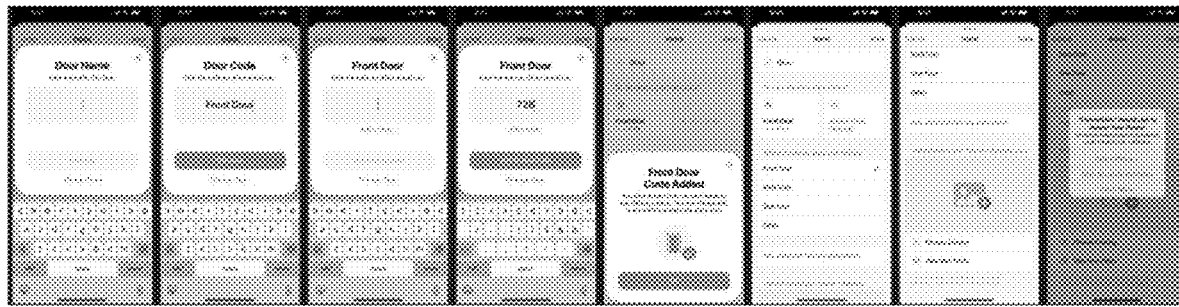
FIG. 22 is an illustration of a device showing an operational sequence for a user adding a door name and code for a delivery address when running the farm-to-table delivery app, according to an embodiment.

FIG. 22 illustrates an operational sequence 2200 within the FarmerEats delivery app, showing the process by which a user adds a door name and code for a delivery address for farm-to-table orders. In this embodiment, the user is prompted to enter detailed information about the delivery address. The first step involves the user providing a door name, which can be a descriptive identifier for the delivery location, such as "front door" or "side entrance." This helps the delivery driver easily locate the appropriate entry point.

Figure 23:
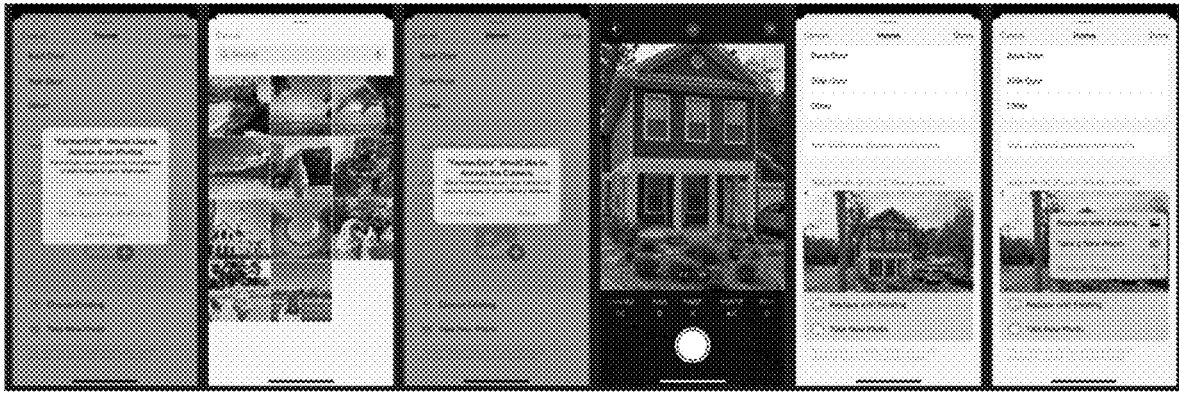
FIG. 23 is an illustration of a device showing an operational sequence for a user adding an image associated with a delivery address when running the farm-to-table delivery app, according to an embodiment.

The user is then required to input a door code, which serves as an access code for gated communities, apartment complexes, or secure entrances. This information ensures that the driver can reach the delivery location without delays. Additionally, the app requests the user to provide a front door code, which may be used for buildings with multiple entryways or for apartments within a larger complex, further helping to narrow down the exact delivery point. For further verification and to enhance the precision of the delivery, the system allows the user to upload a photograph of the delivery address, such as a photo of the front door of a home or a visual marker that helps distinguish the correct location. This photo is stored in the system and can be referenced by the driver during the delivery process. The combination of these inputs, door name, door code, front door code, and a visual reference, improves the overall delivery accuracy and efficiency, ensuring a smooth handoff between the farm and the customer. This process enhances the user experience and minimizes the risk of delivery errors, FIG. 23 illustrates an operational sequence 2300 within the FarmerEats farm-to-table delivery app, showcasing the process by which a user adds an image associated with a delivery address. This functionality allows the app to enhance the delivery process by associating visual references with the delivery location. In this embodiment, the app accesses the camera of a user's electronic device, such as a smartphone or tablet, to take a photo of the delivery location, typically the home where the delivery is scheduled. When the user selects the option to add an image, the app automatically opens the camera interface, allowing the user to capture a clear, high-quality photograph of the front of their home or specific entryway. The photograph can be taken from any angle that best represents the delivery location, such as the front door or any other easily identifiable landmark on the property, like a distinctive mailbox or gate. This photograph is then associated with the user's delivery address.

Additionally, the app can interface with a database of images, enabling the user to select from previously uploaded photos stored in the system if applicable. This feature allows for multiple images to be associated with the same delivery address, providing further clarity in case of changes to the location or delivery point. Once the image is captured or selected, it is automatically uploaded and linked to the delivery address in the system. This visual reference is then available to the delivery driver in real-time, ensuring they can easily identify the correct location upon arrival. By integrating this image functionality, the app improves the accuracy and efficiency of the delivery process. Drivers can reference the photo to help locate the correct entry point, reducing the likelihood of delivery errors, saving time, and enhancing the customer experience.

Figure 24:
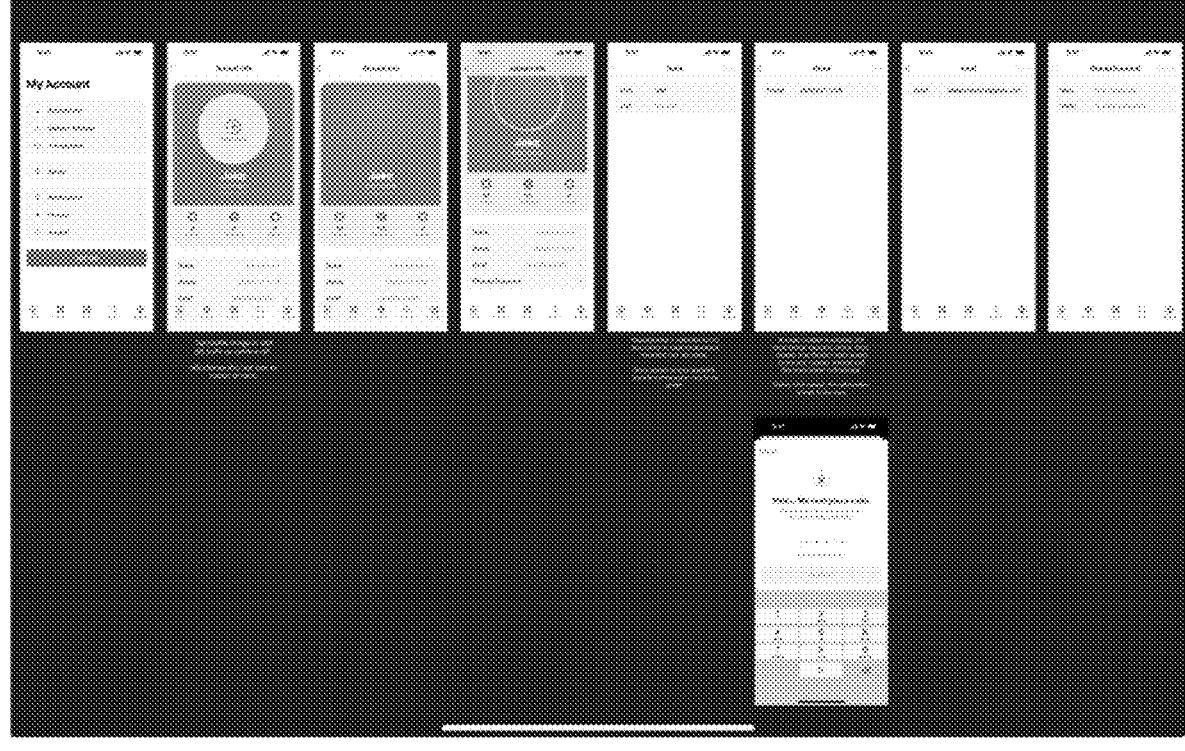
FIG. 24 is an illustration of a device showing an operational sequence for a user adding account data to a profile when running the farm-to-table delivery app, according to an embodiment.

FIG. 24 illustrates an operational sequence 2400 within the FarmerEats farm-to-table delivery app, depicting how a user adds account data to their profile. In this embodiment, the user initiates the process by tapping on the profile image, which acts as an entry point to customize and update the profile details. Upon tapping the profile image, the app prompts the user to access their device's camera roll or gallery. Once the camera roll is accessed, the user can choose an image to upload, typically to personalize their profile. For instance, the user may select a photo from their gallery that they feel best represents their farm or business. In a specific example, when a user taps to change their profile image, the app offers the option to select an image of a tractor, a farm landscape, or other relevant imagery that reflects their involvement in the agricultural or farm-to-table ecosystem. The app can also provide predefined images within the system for users who may not have a personal image available.

After the image is selected, the profile icon changes to reflect the newly chosen image, which could feature a tractor or farm-related theme, aligning with the user's role or business identity. This customization serves to personalize the user experience and provides a visual cue to others interacting with the platform that this user is associated with farming or agriculture. In addition to visual customization, the profile update process includes fields for the user to input and update key account data, such as contact details, farm location, and other relevant information. This step ensures that the profile accurately reflects the user's identity and business, making it easier for customers and drivers to identify the right source for their orders, and for farmers to manage their deliveries more effectively.

FIG. 25 illustrates an operational sequence 2500 within the FarmerEats farm-to-table delivery app, showing how a user adds delivery address data. In this embodiment, the app provides two methods for inputting a delivery address: manual entry and GPS-enabled auto-filling. For manual entry, the user is prompted to input the full address by typing into designated fields within the app. These fields typically include sections for street address, city, state, postal code, and country, ensuring that all necessary address components are captured accurately. In this mode, the user can type the information directly into text fields or select from auto-suggested addresses based on their entry. For example, as the user begins typing the street name or zip code, the app may display a list of matching addresses for the user to choose from, reducing errors and speeding up the input process.

Alternatively, the app supports GPS-enabled address input, which leverages the user's device location services to automatically detect the current location. By enabling GPS, the app can pinpoint the user's location and populate the address fields with the most accurate data. For example, if a user is setting a delivery address while out on a walk, the GPS feature will automatically capture the precise latitude and longitude of their current position, which can then be converted into a full address. The user can review this pre-filled address and make any necessary adjustments if needed. Once the address data is entered, whether manually or via GPS, additional options may be available, such as specifying delivery preferences, including a specific entrance, delivery instructions (e.g., "leave at the back door"), or uploading a photograph of the delivery location (e.g., a photo of the front door or driveway). This additional information helps ensure that the delivery can be made efficiently and accurately.

Figure 26:
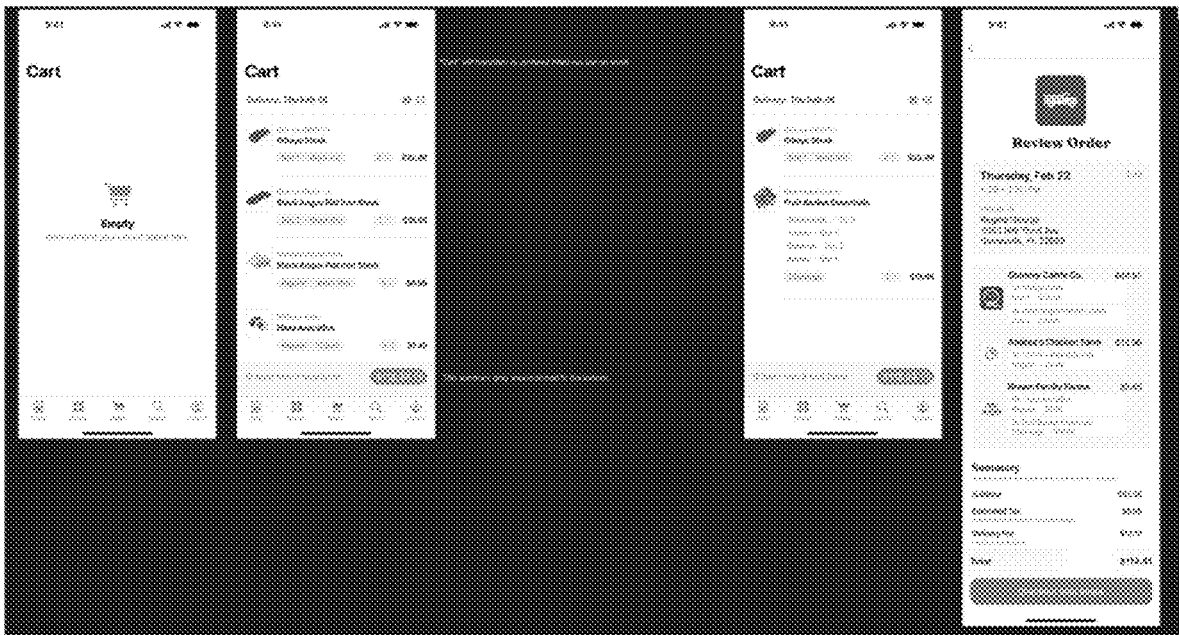
FIG. 26 is an illustration of a device showing an operational sequence for a user adding items to their cart when running the farm-to-table delivery app, according to an embodiment.

FIG. 26 illustrates an operational sequence 2600 within the FarmerEats farm-to-table delivery app, demonstrating how a user adds items to their cart. In this embodiment, the user navigates through a virtual storefront displaying products sourced directly from local farms. The interface is designed to facilitate efficient browsing and selection while providing comprehensive product details. Upon accessing the storefront, the user is presented with categorized product listings, such as "Fruits," "Vegetables," "Dairy," "Meat," and "Bakery." Each product entry includes a high-resolution image, a brief description, pricing information, and the farm from which the item originates. For example, an entry for "Organic Strawberries" might display an image of the fruit, a description noting its organic certification and harvest date, a price per pint, and the name of the farm supplying it. To add an item to the cart, the user taps a prominently displayed "Add to Cart" button. This action triggers an animation confirming the addition and updates the cart icon to reflect the new quantity of items selected. The app also provides options for users to specify quantities directly. For instance, a user purchasing apples may select the desired weight or number of pieces before adding them to the cart.

For items with customization options, such as cuts of meat or bundled vegetable packages, the app displays a popup menu where the user can choose preferences. For example, selecting a "Farm-Fresh Egg Pack" might allow the user to choose between a dozen, half-dozen, or large-sized eggs. Similarly, for a "Seasonal Vegetable Box," the user may specify included items based on availability. The cart itself is accessible at any time via an icon on the screen, allowing users to review, modify, or remove items as needed. The app ensures transparency by showing a running total of costs, taxes, and any applicable delivery fees. Additionally, users can view discounts or promotions applied to their order, such as "10% off all dairy products this week." Advanced features may include real-time inventory updates. For example, if a product runs out of stock while browsing, the app will alert the user and suggest alternatives. Similarly, predictive analytics may suggest additional items based on the user's cart, such as pairing a loaf of sourdough bread with locally churned butter.

Figure 27:
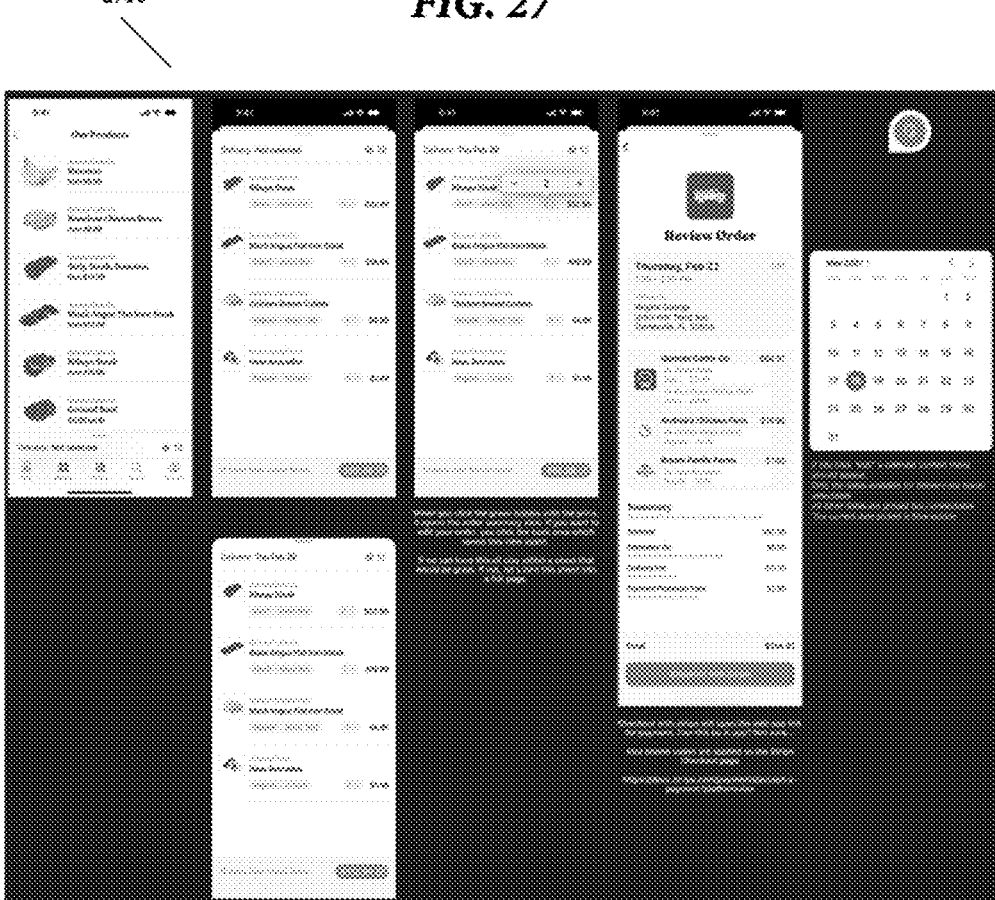
FIG. 27 is an illustration of a device showing an operational sequence for a user editing items to their cart associated with a delivery date when running the farm-to-table delivery app, according to an embodiment.

FIG. 27 illustrates an operational sequence 2700 within the FarmerEats application, enabling users to edit items in their cart associated with a specific delivery date. The interface includes a green icon displaying the total price of the current order. Selecting this icon transitions the display to an order summary view, where itemized order data is presented, including product identifiers, quantities, unit prices, total cost calculations, and the associated delivery date. The order summary interface provides functionality for editing orders by interacting with a "Back" navigation option, which redirects users to the storefront or product listing interface. Users can add items, modify quantities, or remove products from the cart. For instance, quantities can be incremented or decremented via dedicated control buttons, while a "Remove" function enables product deletion. All changes update the total price dynamically through real-time recalculation algorithms executed by the application's backend.

Delivery dates can also be modified using an integrated calendar selector, which verifies availability against backend data constraints for delivery slots and farm schedules. The application incorporates logic to ensure that delivery modifications align with operational parameters, such as service area limits and farm inventory constraints. Recommendations for additional products may be displayed based on cart contents, leveraging machine learning algorithms that analyze historical purchasing data. For example, selecting bread may prompt the system to suggest butter or jam as complementary items. Once edits are completed, the system prompts the user for confirmation, ensuring data integrity before finalizing the updated cart.

FIG. 28 illustrates an operational sequence 2800 within the FarmerEats application, depicting the process of notifying a user about an upcoming delivery. The notification interface leverages device-specific alert mechanisms, such as push notifications on a smartphone, to inform the user of the delivery schedule. In this embodiment, the system generates a notification indicating the delivery day and time window, such as "Your order will be delivered on Thursday afternoon." The notification is dynamically generated by backend processes that retrieve order details, delivery routes, and estimated time frames from a centralized database. The backend system utilizes scheduling algorithms that consider driver availability, service area constraints, and historical delivery patterns to calculate the delivery time. The notification is formatted for readability, including order-specific identifiers such as order ID, delivery address confirmation, and a clickable link to access further order details.

For example, selecting the notification opens a detailed view, providing a comprehensive summary of the order, including itemized products, quantities, and final pricing. The application integrates user preference settings, allowing customization of notification types, such as delivery reminders, status updates, or real-time tracking alerts. For instance, a user may enable a preference to receive additional alerts when the driver is en route or when the order has been delivered. Hardware implementations include mobile processors to manage notification delivery and graphical rendering on the user's device. Backend infrastructure includes servers running queue management systems, such as RabbitMQ, to handle high volumes of notification requests.

Figure 29:
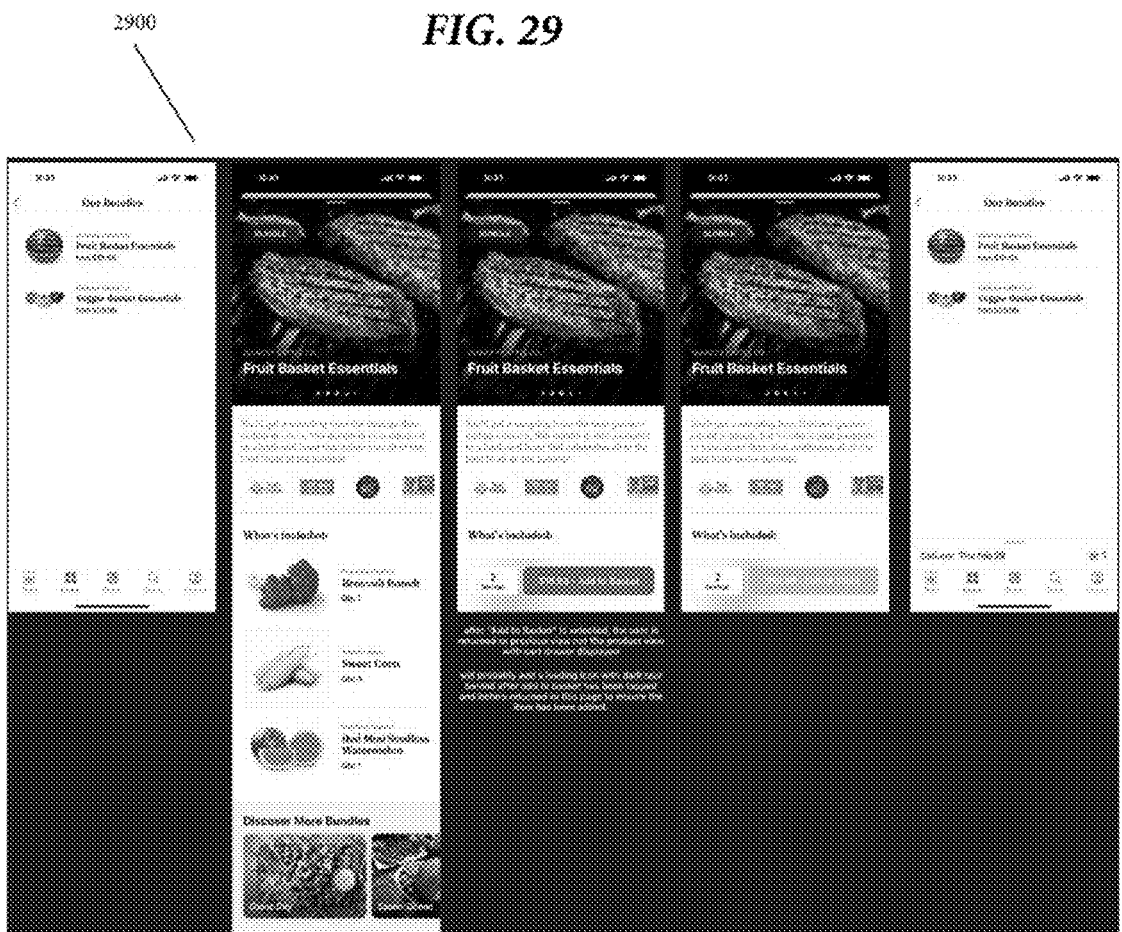
FIG. 29 is an illustration of a device showing an operational sequence for a user being presented with product information when running the farm-to-table delivery app, according to an embodiment.

FIG. 29 illustrates an operational sequence within the FarmerBats application showing the presentation of detailed product information to a user. This sequence enables the user to review item-specific data for selection and purchase. The interface displays product bundles, such as "Seasonal Fruits and Vegetables," along with individual product entries. Each entry includes attributes such as the product name, quantity, unit price, and total cost. For instance, a bundle might list "Apples—2 lbs., $4.00" and "Carrots—1.5 lbs., $3.00," with the total bundle price calculated dynamically based on the user's selections. The product data is retrieved in real-time from a backend database synchronized with farm inventory systems. These databases store product metadata, including availability, pricing, and descriptions, which are queried and displayed via API calls. Backend algorithms ensure data accuracy by cross-referencing real-time inventory levels with user actions, such as adding items to a cart.

User interaction is facilitated through touch gestures, enabling navigation between product categories or detailed views of individual items. For example, selecting a product opens a detailed view, providing additional information such as origin (e.g., farm location), nutritional facts, and harvest date. A comparison feature might allow users to evaluate multiple products or bundles side by side. Hardware components supporting this functionality include mobile processors for rendering the graphical user interface (GUI), local memory for caching frequently accessed data, and network modules for communication with cloud-based servers. Backend systems rely on high-performance processors for real-time inventory management and pricing algorithms.

Figure 30:
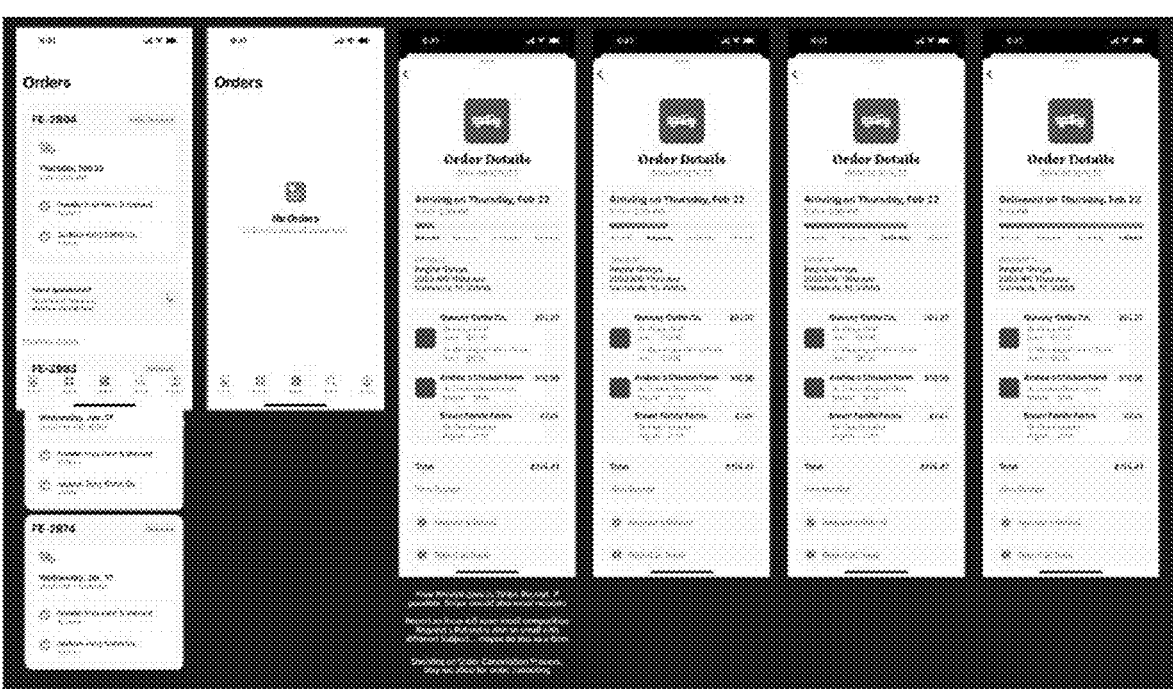
FIG. 30 is an illustration of a device showing an operational sequence for a user being presented with order details when running the farm-to-table delivery app, according to an embodiment.

FIG. 30 illustrates an operational sequence 3000 within the FarmerEats application, presenting order details to a user. The interface provides transactional data, including the scheduled delivery date, itemized list of ordered products, total cost, and a receipt confirmation. The order summary dynamically integrates data from the backend system, which retrieves real-time information from the transaction database. For instance, an order for "Seasonal Vegetables" may display individual items such as "Tomatoes—3 lbs., $9.00," "Lettuce—1 head, $4.00," and "Cucumbers—2 lbs., $6.00," with the total order cost calculated as $19.00. The receipt includes a timestamp, order ID, and payment confirmation status, ensuring traceability and transparency. A delivery schedule field displays the expected arrival date and time, such as "Thursday, December 7th, between 1 PM and 3 PM," based on real-time logistics updates from driver routes and order prioritization algorithms. Users can view additional metadata, such as the delivery address and driver contact information, when applicable. The GUI facilitates user interaction through touch inputs, allowing the user to expand details, download receipts, or initiate customer support queries. Backend processors execute algorithms for data validation and synchronization, ensuring that displayed information reflects current order and inventory statuses.

Figure 31:
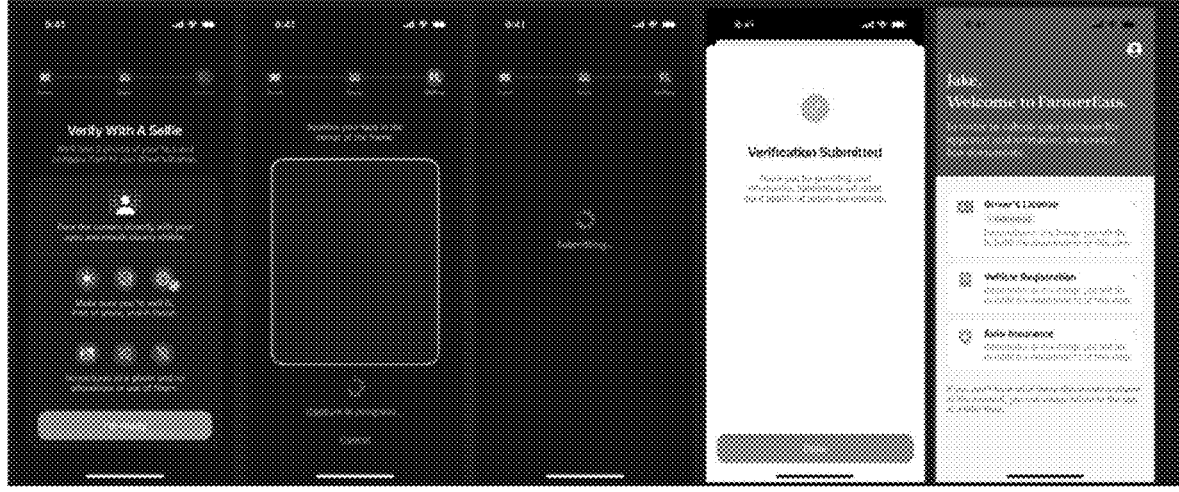
FIG. 31 is an illustration of a device showing an operational sequence for a driver onboarding when running the farm-to-table delivery app, according to an embodiment.

FIG. 31 illustrates an operational sequence 3100 within the FarmerEats delivery platform for driver onboarding. The process includes multi-step identity verification and profile creation. The system requires the driver to capture three high-resolution photographs using the device's camera. These photographs are compared against the image extracted from the driver's government-issued identification card, such as a driver's license, using facial recognition algorithms. The comparison ensures identity authenticity by analyzing biometric features. The driver profile is populated with mandatory credential data, including the driver's license number, expiration date, vehicle registration details, and auto insurance policy information. Data validation algorithms verify the authenticity of these credentials by cross-referencing with government and insurance databases through secure APIs.

The onboarding interface is designed to guide the driver through sequential steps, ensuring compliance with platform requirements. For example, the driver is prompted to scan their license using OCR technology, which extracts and auto-fills license details into the profile. Similarly, vehicle registration and insurance documents are scanned and uploaded, with metadata such as policy expiration and vehicle identification number (VIN) extracted for backend validation. Hardware includes a high-resolution device camera for capturing document images, a secure storage module for encrypting uploaded files, and a processor executing identity verification and data validation algorithms. The system employs secure communication protocols to transmit sensitive information to cloud-based servers for storage and verification. This operational sequence ensures that only verified drivers with valid credentials are onboarded, enhancing reliability and security within the farm-to-table delivery network.

FIG. 32 illustrates an operational sequence 3200 within the FarmerEats delivery platform, detailing the process of driver validation and route data retrieval. During the verification phase, the driver inputs a registered telephone number, which triggers a two-factor authentication (2FA) mechanism. A secure, time-sensitive code is sent via SMS or email, and the driver enters this code into the application for identity confirmation. Additionally, the driver provides their legal name and creates or enters a secure passcode for authentication continuity. Once the driver is successfully validated, the system retrieves and displays route-specific data on the device interface. The route data includes the scheduled delivery date, total number of stops along the route, and an estimated time of completion. Each stop is geotagged, and its location is dynamically plotted on an interactive map interface powered by GPS and real-time traffic data. The hardware supporting this process includes the device's GPS module for location tracking, a secure processor executing encryption algorithms for the authentication process, and a high-resolution display for presenting route details. The backend integrates with cloud services to retrieve delivery data and dynamically update route information in real time, accommodating variables such as traffic conditions or delivery rescheduling.

Figure 33:
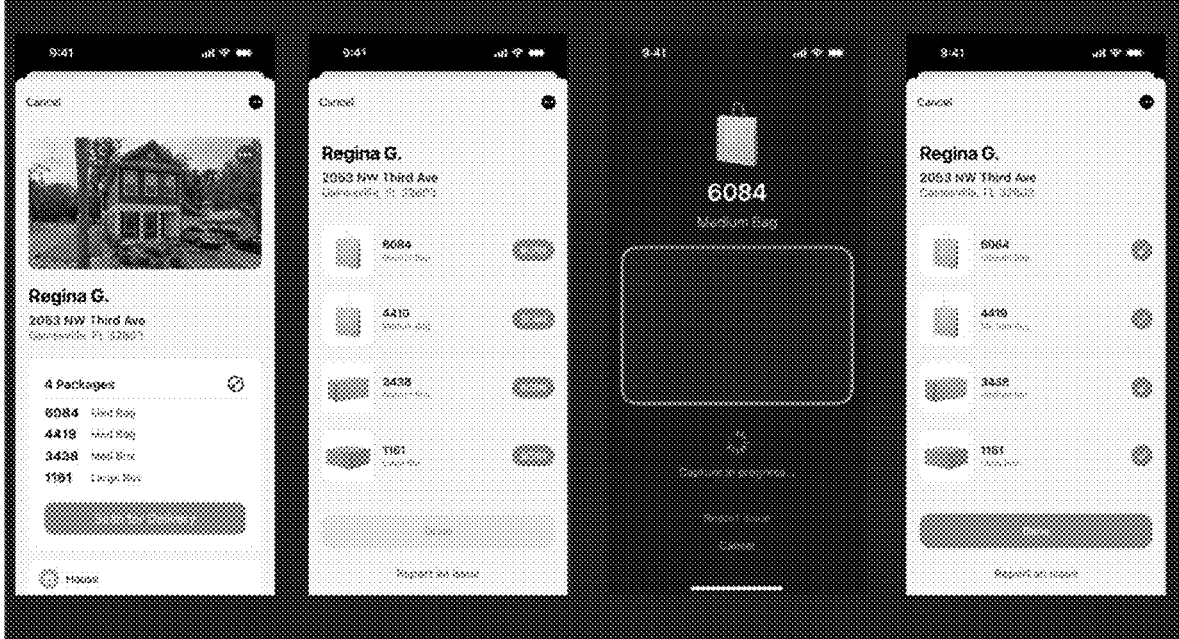
FIG. 33 is an illustration of a device showing an operational sequence for a driver receiving an image of a recipient's house among other route data when running the farm-to-table delivery app, according to an embodiment.

FIG. 33 depicts an operational sequence 3300 within the FarmerEats delivery platform, where a driver accesses route data, including a recipient's property image, to facilitate accurate delivery. Upon starting a route, the application retrieves and displays a photograph of the recipient's house sourced from the platform's database or provided by the customer. This visual reference assists the driver in identifying the delivery location, reducing navigation errors. The route interface includes comprehensive data such as delivery addresses, recipient contact information, estimated arrival times, and package details. Once at the delivery location, the driver selects the appropriate product packaging option from a predefined list within the app, ensuring proper handling and presentation based on product type and customer preferences. The app then prompts the driver to capture an image of the delivered package at the specified location. This photograph, taken via the device's camera, is immediately uploaded to the platform's cloud storage and linked to the delivery record for verification. The metadata, including timestamp and GPS coordinates, is appended to the image for audit and customer confirmation purposes. The system may implement secure hardware processors to handle encryption and secure data transmission of sensitive customer information and delivery details.

Figure 34:
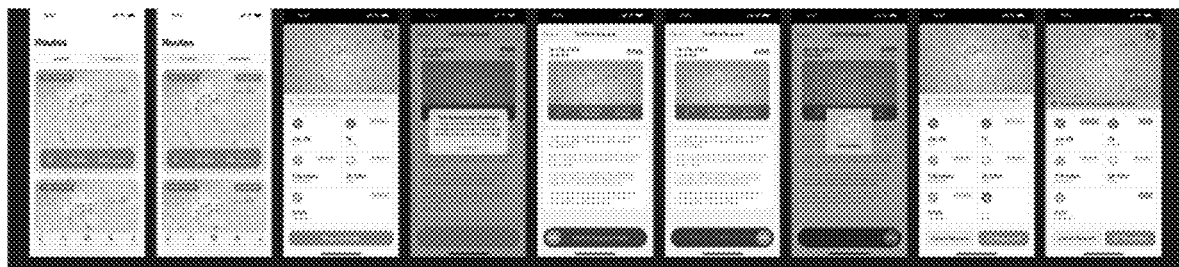
FIG. 34 is an illustration of a device showing an operational sequence for a driver receiving a route based on proximity of the location of the driver to the farm, order pick up address, and/or delivery address when running the farm-to-table delivery app, according to an embodiment.

FIG. 34 illustrates an operational sequence 3400 within the FarmerEats delivery platform, where a driver is assigned a delivery route dynamically optimized based on real-time proximity data. The system integrates GPS location data from the driver's device with pre-determined farm locations, order pick-up points, and delivery addresses. Using algorithmic processing, the platform generates a route that minimizes travel time and maximizes delivery efficiency by prioritizing locations in closest proximity to the driver. Upon initiating a shift, the driver's GPS coordinates are transmitted to the platform, where they are analyzed against a database of active orders and available routes. The system dynamically calculates the optimal sequence of pick-up and drop-off points, considering factors such as distance, traffic patterns, and scheduled delivery windows. The route is presented to the driver via the app interface, displaying sequential stop locations, estimated arrival times, and navigation prompts. Each stop includes detailed instructions, such as product-specific handling notes and customer preferences, ensuring compliance with delivery requirements. The app updates in real time to reflect changes in conditions, such as new orders or cancellations, recalibrating the route to maintain operational efficiency. The process leverages advanced hardware processors for high-speed computation and secure transmission of sensitive data, ensuring responsiveness and accuracy. By dynamically forming routes based on precise location inputs, the system reduces fuel consumption, shortens delivery times, and enhances scalability for farm-to-table logistics.

The interface supports interactive features, such as the ability to click on individual service areas and/or zip codes for more detailed insights. For example, selecting a service area including, but not limited to, Orlando North opens a detailed dashboard showing farm-to-user delivery routes, farm production levels, and/or driver availability, while clicking on a specific zip code allows administrators to view user demographics, product preferences, and/or past order histories. The platform also includes tools for managing service area configurations, such as adding new zip codes, adjusting delivery zones, and/or assigning additional drivers to high-demand areas. By integrating real-time data, financial metrics, and logistical details into a single interface, the Service Area Listing feature enhances operational efficiency and supports data-driven decision-making. This functionality is configured for management of regional delivery activities, optimizes resource distribution, and may improve the customer experience by providing timely and efficient service across many active areas.

The FarmerEats application operates on a hardware infrastructure comprising advanced processors and integrated systems optimized for high-performance computing and data handling. User devices, including smartphones, tablets, and desktop systems, are equipped with multi-core processors such as ARM-based architectures in mobile devices or x86 processors (Intel Core, AMD Ryzen) in desktops. These processors execute application code to enable user interactions, manage local data caching, and render graphical user interfaces efficiently. For instance, farmers utilize touch-enabled devices with integrated image processing units to capture and upload product data, while customers interact with order systems via real-time UI elements supported by device GPUs.

Backend operations are managed by high-capacity servers powered by enterprise-grade processors such as Intel Xeon or AMD EPYC, designed for parallel processing and low-latency data handling. These servers host relational databases, process algorithmic computations for predictive analytics, and execute machine learning models to forecast demand and optimize logistics. The processors leverage multiple cores and hyper-threading to perform concurrent operations, including dynamic data synchronization and query resolution for high user volumes. IoT devices integrated into the system include smart scales and environmental sensors equipped with microcontrollers, such as ARM Cortex-M series processors, to capture and transmit product quality and inventory metrics. These devices utilize low-power wireless communication protocols like BLE (Bluetooth Low Energy) or Wi-Fi for data integration with the application backend.

Drivers' devices, often ruggedized tablets or smartphones, incorporate GPS modules and SoCs (System-on-Chip) for real-time navigation and route optimization. The processors onboard these devices handle geospatial computations and communicate with central servers to provide status updates and delivery tracking. Additionally, these devices interface with secure payment modules, such as EMV-compliant card readers containing dedicated cryptographic processors for secure transaction execution.

In an example, the network layer utilizes high-throughput routers and switches equipped with specialized network processors, such as those by Broadcom or Qualcomm, to maintain low-latency connections and high-bandwidth data transfer. These components support the communication between edge devices, IoT hardware, and server infrastructure, ensuring consistent data flow across the system. This hardware ecosystem, comprising computationally intensive servers, efficient edge devices, IoT systems, and networking components, enables the execution of complex application functionalities such as QR code generation, predictive demand analytics, and dynamic driver allocation. The architecture is engineered for scalability, reliability, and the rapid processing of high-frequency operations to the farm-to-table delivery model.

In an example, a unique technical solution implemented within the FarmerEats application is the integration of a decentralized edge computing model with predictive analytics to optimize farm-to-table delivery logistics. This approach employs IoT-enabled devices, advanced processors, and machine learning algorithms to dynamically allocate resources and streamline operations. The system utilizes edge devices installed at farms, such as IoT gateways with ARM Cortex-A processors, to locally process sales data and environmental metrics. These gateways employ lightweight algorithms to generate real-time insights into inventory levels, product quality, and packaging readiness, reducing latency and minimizing reliance on centralized servers, For example, QR codes are dynamically generated directly on edge devices using integrated cryptographic processors to ensure secure and tamper-proof product tracking. Predictive analytics models are distributed across the infrastructure, leveraging Tensor Processing Units (TPUs) and Graphics Processing Units (GPUs) on central and edge servers. These models analyze historical sales data, environmental conditions, and regional demand patterns to forecast order volumes and adjust delivery schedules. The distributed nature of the computing model reduces computational bottlenecks, enabling the system to adapt in real time to changing variables such as weather impacts on farm yields or traffic patterns affecting delivery routes.

For driver assignment, the system incorporates a geofencing algorithm executed on edge-enabled devices to match orders with drivers based on proximity, availability, and vehicle capacity. This solution employs GPS modules and SoCs within drivers' devices to track real-time locations and compute optimized routes. A decentralized data exchange protocol synchronizes route updates, ensuring low-latency communication between devices and the central server. The solution's integration of decentralized processing with predictive modeling provides enhanced scalability and fault tolerance. By offloading computational tasks to edge devices, the system ensures continuous operation even during network disruptions, offering a framework for managing the complexities of farm-to-table logistics.

As noted above, in an example, the unique technical solution leverages decentralized edge computing, predictive analytics, and advanced hardware integration to optimize the performance and reliability of the FarmerEats platform. IoT-enabled edge devices deployed at farms and within delivery vehicles serve as localized hubs for data collection and processing. These devices, equipped with ARM Cortex-A processors or similar microprocessors, integrate environmental sensors, GPS modules, and secure storage to enable real-time monitoring and computation. For QR code generation, cryptographic processors, such as Trusted Platform Modules (TPMs), dynamically create QR codes encapsulating product ID, batch details, and farm information. Lightweight encoding algorithms ensure rapid generation and integration into the inventory system.

Predictive analytics is implemented using machine learning frameworks like TensorFlow Lite, optimized for edge computing and deployed on TPUs (Tensor Processing Units) or GPUs (Graphics Processing Units). These models analyze historical sales data, weather patterns, and regional trends to forecast product demand and delivery needs. Driver assignment is managed through geofencing algorithms executed on mobile devices powered by System-on-Chip (SoC) architectures, which integrate GPS and communication modules. These algorithms continuously track driver locations and match them to farms and delivery points based on proximity, vehicle capacity, and availability. Localized execution of route optimization reduces latency and dependence on central systems.

Data synchronization between edge devices and central servers is achieved using decentralized protocols like MQTT (Message Queuing Telemetry Transport), ensuring efficient communication with minimal bandwidth usage. The back-end infrastructure features high-performance servers with Intel Xeon or AMD EPYC processors for managing central computation tasks and database operations, supported by networking hardware with high-throughput capabilities. Redundant storage systems enhance data integrity and availability. This architecture also incorporates fault tolerance and scalability. Edge devices maintain local functionality during network disruptions, independently handling tasks until connectivity is restored. This decentralized approach enables the system to handle increased demand by scaling hardware and computing resources. Together, these components deliver an adaptive platform that efficiently manages farm-to-table logistics.

In an embodiment, a method includes providing the farm-to-table delivery app. Once a purchase has been processed, using the farm-to-table delivery app, the farmer and/or administrator will receive a notification of the sale. This notification lets the farmer know that they may start packaging and processing the order within their own internal system. To keep track of their inventory, every producer, such as a farm, disposes a Farmer Eats QR code on a product package. This code needs to be scanned and added to their inventory count whenever a product is sold, so that it may be removed from the app, and whenever a product is packaged, so that it may be added to their inventory system. When the product is packaged and ready to be shipped out, the farmer will be able to notify drivers when to come by and pick up the package for delivery to the customer.

During the onboarding process, drivers are given the option to set their availability by scheduling it on their calendar. Once their availability and time slots are set, the driver will receive notifications on when to pick up orders. There is a minimum 12-hour delay between when the farmer packages an order and when the driver is notified to pick it up. The farmer will advise the driver when to pick up the order on the next available day or the soonest appointment possible based on the closest driver and any scheduling issues. When the driver arrives at their zoned farm, the driver will be able to pick up orders in bulk based on what was sold and processed. When the driver confirms they have received the orders this will trigger a notification to the customer that the order is on route to the destination.

Upon entering their personal details and specifying their vehicle's capacity for orders, the driver will be allocated a specific farm and guided along the most efficient route to fulfill all deliveries. This routing system closely mirrors Amazon Flex Delivery's approach. When it is time for the driver to collect their orders and embark on their delivery route, the system will provide them with the swiftest route to complete all drop-offs. The routing system is strategically configured to bring the driver as close as possible to their initial starting point or residence. Upon reaching each customer's destination, the driver will be prompted to capture a photograph of the package. This image serves as a recorded proof for liability purposes, should a customer raise any disputes. This procedure applies universally, irrespective of the chosen delivery method-be it a drop-off or a direct handover at the customer's doorstep. Subsequently, this stage marks the customer's opportunity to provide feedback for both the driver and the farmer. This entire process begins anew when a customer wishes to make another purchase, commencing at stage 5.

In an embodiment, a method includes providing the farm-to-table delivery app. The step-by-step process a driver will go through while working on the Farmer Eats driver app platform is one example of many variations. For instance, during the onboarding of a driver, several variables need to be taken into consideration. These include the type of vehicle and its miles per gallon, the location of the driver (each driver will be assigned to pick up from a specific farm), the number of orders to be delivered, and the driver's schedule. It is important to note that the minimum order value for customers is set at $50. Additionally, the rate of gas consumption and the miles per gallon (MPG) of each vehicle need to be tracked.

Firstly, in terms of vehicle type, priority will be given to vehicles with higher mileage per gallon over those with lower mileage. For instance, a 2023 Prius Legacy offers around 47-59 miles per gallon, whereas a 2019 Diesel F-150 provides 19 miles per gallon. The app will initially contact drivers with more fuel-efficient vehicles due to their effectiveness. Regarding the location of the driver, similar to the school zoning system in the U.S., the driver's current address is required during onboarding. Based on this information, the closest farm will be assigned as their pick-up point. Users are restricted from placing orders through multiple farms. Drivers will be responsible for picking up multiple orders while working for Farmer Eats; they will not have the option to complete just one order and then finish their shift. The driver app will provide specific details in order notifications, including the number of orders for delivery, the projected earnings for the day (excluding tips), and the estimated time for the entire route. In Stage 1, which focuses on North Florida, routes are not expected to exceed 100 miles. Drivers will have the ability to set their availability on the application. Those with greater availability throughout the week will be contacted first for order assignments. Drivers who have limited availability will receive a minimum number of orders, Farmer Eats has several operational models to manage its delivery system, each inspired by established industry methods and ranked based on feasibility for the business. One option is the flexible delivery model, where drivers operate as independent contractors to pick up and deliver orders directly from farms to customers. This approach provides flexibility for both the drivers and Farmer Eats, while also ensuring efficient last-mile delivery. Another potential model is the centralized warehouse model, where products from multiple farms are stored in a central location. Orders are then fulfilled and dispatched from this hub, allowing for streamlined inventory management and faster delivery times, especially in urban areas. This model is similar to systems used by companies that focus on rapid delivery services.

Another possibility for Farmer Eats is a subscription box-style delivery system, where pre-packaged farm products are prepared and shipped to customers on a regular basis. This approach, which mirrors the subscription models of meal delivery services, offers customers convenience and allows Farmer Eats to better forecast demand and streamline packaging and delivery processes. Lastly, Farmer Eats could adopt an on-demand delivery model, using a network of independent drivers to pick up and deliver individual orders from farms to customers, emphasizing speed and customer convenience, particularly for smaller or more immediate orders. Farmer Eats can explore a range of GPS tracking systems to enhance its delivery operations, with the ideal choice depending on the volume of orders and specific delivery needs. For businesses handling low order volumes, a popular map application offers a simple and reliable solution. Known for its integration with various online services, it is especially effective for smaller-scale operations where ease of use and route accuracy are essential. For situations where traffic congestion is a concern, an app configured for real-time traffic alerts and route optimization can be particularly useful. This type of app helps drivers avoid delays by utilizing live updates from other users, improving delivery efficiency.

When precise, turn-by-turn navigation is a priority, a widely-used navigation app is a solid choice, providing detailed directions and intuitive controls. This is especially beneficial in urban or suburban areas where navigating complex street systems is a challenge. Additionally, for deliveries in remote or rural areas with potential signal issues, a GPS mapping app with offline functionality offers an excellent solution. This type of app allows drivers to download maps for use without an internet connection, ensuring reliable navigation even in low-connectivity environments. By leveraging a combination of these systems, Farmer Eats can optimize its delivery routes to meet the specific needs of different areas, such as using a real-time traffic app in cities and an offline map app for rural deliveries, ensuring efficient service regardless of location.

In an embodiment, a method includes providing the farm-to-table delivery app as described herein. This comprehensive driver logistics flow aims to ensure an efficient and effective experience for drivers working on the Farmer Eats platform. Order Confirmation System: The Ticket System streamlines the process for drivers handling multiple orders from farmers. Instead of displaying orders one by one, the system presents them in a bulk format. Each delivery request includes details, such as the farm's name, the number of orders within the route, and the total earnings for that set of orders. For instance, a delivery request might appear at 5:42 PM, comprising 24 orders, spanning 98 miles, with a total earnings estimate of $327 for the entire route.

In an embodiment, the driver availability functions in the same manner as displayed. This feature grants Farmer Eats instant access to precise delivery times for customers. The algorithm supports drivers who meet specific criteria. For example, availability for five shifts a week will be favored over availability for just one shift. Similarly, vehicles with a higher load capacity, for example, 300 pounds versus 20 pounds, and better fuel efficiency, such as 24 miles per gallon versus 17 miles per gallon, will receive preference within the system.

In an embodiment, a path system for delivery includes each driver being automatically assigned to specific farms based on their location. When a driver inputs their current address, if it is, for instance, 20 miles away from Donna's farm but 50 miles from Esterege's farm, the driver will be zoned to the closest farm for order pick-up. The home address provided will be the endpoint for their return journey. As drivers embark on their routes, they will initially travel from their current location to the designated farm pick-up station. From there, they will proceed to each destination in the most efficient manner, ultimately concluding at their home address. For instance, if there are 10 orders destined for 10 different locations, the system will organically arrange them to minimize the distance from the current home address.

In an embodiment, delivery systems may be equipped with their own navigation tools. For instance, Uber employs UberNav, which exclusively integrates with Google Maps and Waze for routing. Through our research, Waze has proven to be the most efficient in terms of traffic avoidance and selecting optimal routes for reaching destinations.

In an embodiment, payment structure to drivers includes the algorithm calculating all costs and margins for each delivery, including the driver's payment, fuel, maintenance, and other expenses. The system aims to provide the highest earnings without compromising the product margins. It also considers how to compete with other delivery systems based on scheduling and availability. While Uber Eats allows instant driving, Farmer Eats will have a 1-2 day window for deliveries where drivers commit to multiple orders for one day. Our system is configured to allow users to work for both companies simultaneously, maximizing their profits. Additionally, it does not require drivers to leave their homes; as long as their availability is active, they can accept orders from their homes, whereas Uber Eats requires drivers to be in their vehicles ready to go online.

In an embodiment, assigned refers to the process of allocating or designating tasks to specific individuals or entities. In this context, it means that the orders received by farmers will be distributed or delegated to drivers based on two criteria: Availability: Drivers who are currently available for delivery and Proximity to the farms: Drivers who are geographically closer to the farms where the products need to be picked up. The system may automatically decide which drivers should handle which orders, considering these factors. This ensures that the orders are efficiently and effectively delivered.

In an embodiment of a step-by-step process for the driver logistics and order confirmation system, farmers may receive multiple orders from different customers. These orders will be automatically assigned to drivers based on their availability and proximity to the farms. To ensure the efficient handling of bulk orders, the load of the vehicle will be recorded per user within the driver onboarding system. Next, the driver will receive the delivery request on their dashboard. This request will include details like the name of the assigned farm, the number of orders, the total distance to be covered, and the total earnings for the delivery route. Upon receiving the request, the driver will confirm the order and proceed to the farm to pick up the orders. After picking up the orders, the driver will utilize the delivery system's navigation system, such as Waze, to navigate to the customers' locations. The delivery system will provide the driver with the most efficient route for delivering the orders, considering factors like traffic conditions, distance, and estimated delivery time. Once the driver successfully completes the delivery, the payment will be processed and credited to the driver's account.

In an embodiment, a numerical example of the driver flow includes the driver beginning by receiving a delivery request for 10 orders, each from different customers. This request details the name of the farm, the number of orders, and the total earnings for the delivery route, which amounts to $150. After confirming the order, the driver proceeds to the farm to pick up the orders. Once the orders are in their possession, the delivery system offers the driver the most efficient route for delivery. Upon completion of the deliveries, the driver's account is credited with the payment of $150.

In an embodiment, a step-by-step process for the driver availability includes the process initiating with the driver configuring their availability and providing vehicle information within the delivery system. The delivery system then employs an algorithm to align the driver's availability and vehicle details with orders originating from the farms. Subsequently, the driver receives delivery requests based on their availability and proximity to the farms. Upon confirmation of an order, the driver heads to the farm to pick up the required items. Once the orders are obtained, the driver carries out deliveries, adhering to the most efficient routes suggested by the delivery system. Finally, the payment is processed and promptly credited to the driver's account.

In an embodiment of the algorithm for driver availability, the process begins with the driver configuring their availability and providing vehicle information through the delivery system's user interface. This configuration allows the driver to specify their working hours, days of operation, and preferred vehicle details, such as the vehicle's capacity, type (e.g., van, truck, or car), and license plate number. This information is stored in the system's backend database. Once the driver's details are entered, the delivery system employs an algorithm that continuously evaluates the driver's availability against incoming orders from farms. The algorithm considers both the driver's specified working hours and geographic proximity to the farm locations, factoring in real-time location data. When an order is placed by a customer at a farm, the system first checks the available drivers within a predefined proximity to the farm, ensuring that they are also available during the time slot requested for the order. The system then uses a matching algorithm to prioritize drivers based on several criteria: proximity to the farm, vehicle capacity requirements (to ensure the driver can carry the required load), and the driver's stated availability. Once a suitable driver is identified, the delivery system sends a notification to the driver, providing them with the details of the delivery, including the pickup location at the farm, the products to be transported, and the customer's delivery address. If the driver accepts the delivery request, the system then assigns the delivery task to them and updates the order status accordingly.

The driver's availability is continuously updated in the system, ensuring that new requests are only sent to those who are active and available during the designated times. Additionally, the system can dynamically adjust delivery assignments based on real-time conditions, such as traffic delays or vehicle issues, ensuring that the farm, customer, and driver are all kept informed throughout the process. To implement the described algorithm, a hardware infrastructure is necessary to support driver availability, order management, and real-time notifications. The core processing and data storage would reside on powerful centralized servers, either on-premises or cloud-based, running the delivery management software. These servers would handle the algorithm that matches drivers to orders based on their availability and proximity to farms. They may need sufficient processing power, storage capacity, and backup systems to manage real-time data from drivers, orders, and farms, with a distributed server network to ensure reliability during peak times. Drivers may use mobile devices, such as smartphones or tablets, equipped with GPS for location tracking and real-time interaction with the system. These devices would enable drivers to receive notifications, accept or decline orders, and navigate delivery routes. Each farm would require a terminal or POS system, either a desktop computer or tablet, to input order details into the system, allowing farm managers to configure deliveries and product orders. This system would integrate with the backend server infrastructure, sending orders directly to matching drivers.

For accurate proximity matching and real-time tracking, GPS and geofencing technology would be implemented. GPS devices in the mobile devices of drivers, combined with geofencing technology, allow the system to track drivers' locations and assign orders based on proximity to farms or delivery locations. The system would also include a communication and notification infrastructure, utilizing email, SMS, push notifications, or in-app messages to alert drivers of new delivery requests and inform farm managers and customers about order statuses and expected delivery times. To store and access driver availability, order data, and farm details, a cloud-based database would be essential. This database would be optimized for real-time access and scalable to handle large volumes of data, ensuring quick lookups of driver details, order statuses, and other system variables.

Given the importance of maintaining continuous operation, backup and redundancy systems would be essential to prevent delays or service interruptions. Redundant servers, databases, and communication systems would ensure the platform remains functional in the event of hardware failure. Cloud-based backup solutions would support quick data recovery after outages. Additionally, Internet of Things (IoT) devices, such as telematics or vehicle tracking sensors, could be used for real-time monitoring of driver vehicles. These IoT devices would track vehicle conditions like speed, location, fuel levels, and maintenance needs, integrating with the algorithm to adjust for potential delays or issues. Finally, a central control dashboard or admin interface would be required for farm administrators to manage delivery operations. This web-based interface would provide real-time data on driver availability, order assignments, and delivery statuses, with the flexibility to adjust assignments if problems arise. The integration of these hardware components, along with the delivery management software, would create a system that ensures efficient, timely deliveries while minimizing disruptions.

In an embodiment, a step-by-step process for the path system for delivery includes drivers being designated specific farms based on their geographical zone and proximity to these farms. The driver provides their current location and the intended destination in the delivery system. The delivery system utilizes an algorithm to assign the driver to the closest farm when it comes to picking up orders. Subsequently, the driver travels from their current location to the farm to retrieve the orders. Once the orders are secured, the delivery system furnishes the driver with the optimal route for successful delivery. The driver then proceeds to deliver the orders to the customers, adhering to the most efficient route provided by the delivery system. The final delivery is strategically chosen to be closest to the driver's target address, facilitating their return home with ease.

The system for assigning an order to a driver based on predetermined proximity to the farm operates through a combination of geospatial algorithms, real-time data processing, and proximity matching. Initially, drivers configure their availability and provide vehicle details in the system, including their location and vehicle capacity, which is updated via GPS on their mobile devices. When a new order is placed by a farm, the system captures the farm's location and delivery requirements, then uses geospatial algorithms to identify nearby drivers. The system evaluates the farm's location, the driver's available zones, and real-time geographic data, generating a list of drivers within a predefined radius of the farm.

The core of the process is a proximity matching algorithm that calculates the distance and estimated travel time from each driver to the farm, factoring in real-time traffic conditions, road closures, and typical travel times. Drivers are ranked based on their proximity, availability, vehicle capacity, and past performance. If multiple drivers are within a similar proximity range, the system prioritizes those who are immediately available or have higher ratings. Once a driver is selected, the system sends a real-time notification to their mobile device with order details, including the pickup location and expected delivery time. If the driver declines, the system reassesses and assigns the order to another nearby driver.

The system continuously tracks the driver's progress through GPS, and if delays or issues arise, the order can be reassigned to another driver in proximity. Over time, the system learns from historical data, adjusting its proximity parameters and assignment algorithms to optimize future deliveries. It adapts to changing conditions such as traffic patterns, seasonal demand, and driver preferences, leading to faster deliveries, reduced wait times, and optimized use of drivers. By integrating real-time tracking with proximity matching, the system ensures efficient delivery assignments while continuously improving operational efficiency.

In an embodiment, a step-by-step process for the payment structure to drivers includes the delivery system systematically computing all costs and profit margins associated with each delivery. This includes the driver's payment, fuel, maintenance, and other relevant expenses. Employing an algorithm, the delivery system determines the most lucrative delivery routes for drivers, considering their availability, vehicle type, and location. The driver receives payment for each completed delivery, with the amount promptly credited to their account. Additionally, the delivery system offers incentives and bonuses to drivers who excel in completing deliveries or handle deliveries in remote locations.

In an embodiment, the analysis of the Driver App reveals several positive outcomes. Firstly, the system offers a flexible scheduling feature, enabling drivers to concurrently work for multiple delivery platforms. Additionally, it presents a more lucrative payment structure for drivers compared to other delivery systems, considering their expenses and profit margins. Moreover, the system ensures a dependable and efficient delivery service, resulting in an increased customer base and order volume.

However, there are potential drawbacks to consider. One major concern revolves around the system's reliance on technology, including the app and navigation system. Any potential malfunctions or downtime in these systems could lead to delays and disruptions in the delivery process. Additionally, the availability algorithm may limit the pool of eligible drivers, potentially resulting in extended wait times for customers or an inability to fulfill all delivery requests. Furthermore, the system heavily depends on drivers to adhere to timely pick-up and delivery schedules; any mistakes or delays on their part may lead to customer dissatisfaction or revenue loss. Additionally, the system's delivery window, which ranges from 1-2 days, may not cater to customers in need of immediate delivery, unlike instant delivery services like Uber Eats. Lastly, the system is poised to face stiff competition from other delivery services, making it potentially challenging to attract and retain both drivers and customers in an already crowded market.

When farmers onboard the Farmer Eats Farmer App for the first time, they will encounter a lengthy questionnaire. Although time-consuming, it is necessary to meet all standard and legal regulations. The requirements and inventory tracking methods that need to be utilized are as follows: In an embodiment for Farmer Eats Onboarding: To onboard farmers onto the Farmer Eats app for selling local organic products, the application needs to collect specific information and go through a 2-3 day approval process, including an inspection: In an embodiment for Personal Information: This includes the farmer's name, contact details (phone number, email, address), and identification (ID, driver's license, etc.). In an embodiment for Farm Details: This involves providing the farm name, Federal ID number, location, size of the farm, certification status (organic, if applicable), and type of farming (crop cultivation, livestock, aquaculture). In an embodiment for Proof of Certification: Farmers must obtain the necessary certifications for organic farming, food safety, and any other applicable standards. In an embodiment for Harvesting Time for Specific Products: This section requires a list of specific products grown or raised on the farm, along with details about harvesting seasons for each product and expected quantities available during different seasons.

In an embodiment for Product Categories: In an embodiment for Meats: Specify the types of meats available (beef, pork, chicken, lamb, etc.). This also involves providing a comprehensive list of different meat cuts for each type of meat (e.g., steak, ground beef, pork chops, chicken breast, etc.) and ensuring that the meats meet relevant health and safety standards. In an embodiment for Produce: Enumerate various types of organic produce (fruits, vegetables, herbs) and verify that the produce meets organic farming standards. In an embodiment for Seafood: Mention the different seafood options available (fish, shellfish) and confirm that the seafood adheres to sustainable fishing practices and meets health regulations. In an embodiment for Pick Up Hours: Farmers need to set their availability to ensure customers can order at an appropriate time and for drivers to have time periods to come by to pick up products. This information will be connected to the driver app, allowing drivers to accept orders with specified time slots regarding farm pick-up and delivery.

In an embodiment for Facilities Inspection by Farmer Eats Staff: This step involves an inspection by a Farmer Eats staff member to verify the compliance of facilities with the contract and system standards. This includes checking medications, pesticides, fertilizers, cleaning equipment, storage units, and the quality assurance process for packaging. Once the farmer has provided all the required information, the application will initiate a thorough review process. This includes verification of certifications and product quality. The approval process will take approximately 2-3 days to ensure compliance with all legal and safety regulations.

To update the menu of a farmer app during different harvesting seasons, the following methods are recommended to help farmers manage their inventory: Database Integration: Ensure that the app's menu is dynamically linked to the database containing information about products and their respective harvesting seasons, Establish a structured database that includes information about available products, their seasonal availability, and associated farms. Automated Menu Updates: Implement an automated system that updates the menu based on the information in the database. Schedule regular updates, preferably during off-peak hours, to minimize disruptions to app users. Timely Notifications: Send notifications to farmers as seasonal changes approach. Provide advance notice, such as 30 days, 15 days, and 3 days prior to the upcoming seasonal change. These notifications will remind farmers to review and update their product availability for the new season. Farmer-Initiated Updates: Empower farmers to have control over their menu and product availability. Allow farmers to access the app and update their product offerings based on the upcoming seasonal changes. Provide an intuitive interface that allows farmers to make changes easily.

In an embodiment for a Flexible Menu Display: Implement a dynamic menu display that adjusts based on the availability of products during different seasons. Show only the products that are currently in season and available from participating farms. Clearly indicate the start and end dates of each product's availability on the menu. Sync with Inventory Management: Integrate the menu update process with the inventory management system. When farmers update their menu, ensure that it reflects the corresponding changes in available inventory. Data Analytics and Insights: Leverage data analytics to identify patterns and trends in product availability during different seasons. Use these insights to improve menu updates and provide recommendations to farmers regarding potential product offerings. By automating menu updates, providing timely notifications, and enabling farmers to control their product availability, the farmer app can ensure that the menu accurately reflects the available products during different harvesting seasons.

QR codes play a role in the Farmer Eats app's inventory management system. They serve as the primary method for storing inventory data. When a QR code is scanned, the app can recognize and link it to its corresponding category.

To implement the inventory management system for Farmer Eats, a QR code label printer is provided for generating labels that can be affixed to product packaging. Along with the printer, QR code generator software will be employed to create the codes that link each product to its respective details, such as its farm origin, category, and specific type. The Farmer Eats app will then be used to scan these QR codes and track inventory throughout the supply chain.

The process for managing inventory begins with the Farmer Menu Onboarding, where farmers register their products within the system, providing details such as product categories, available quantities, and delivery timelines. Once the menu is established, category fulfillment takes place, which involves farmers selecting the categories they will fulfill, such as produce, meats, or dairy. After category selection, QR code creation is performed using the software, which generates unique codes for each product that the farmer offers. These QR codes are then printed in bulk to ensure a steady supply for all product shipments. Following the printing process, the Farmer Eats to Farmer QR Sticker handoff occurs, where the printed QR code labels are delivered to the farmers. The farmers then package their products by affixing the QR codes to the packaging of each product, ensuring that each item can be easily tracked. Finally, once the packaging is complete, the farmers scan the QR codes, and the inventory is updated automatically within the system. This ensures real-time tracking of products from the farm to the consumer, providing an efficient and transparent way to manage inventory across the supply chain.

When farmers or users access Farmer Eats, the app will be organized into main categories. These include Meat, Seafood, and Produce. Within each category, there are further subdivisions. For example, under Meat, there are Red Meat and Poultry. Each of these has subcategories, such as types of red meat (Beef, Pork, Lamb, etc.) and types of poultry (Chicken, Turkey, etc.). Furthermore, within each subcategory, there may be additional divisions based on specific styles or cuts, as well as size options. For instance, under Red Meat, you might find Filet Mignon, and within Seafood, there could be Fresh Crab. Additionally, sizing options like Small, Medium, or Large may be available. This structured organization ensures that users can easily navigate the Farmer Eats app, starting from the main categories down to specific types, styles/cuts, and sizes of products available.

In the context of Farmer Eats, the style and cut of products can vary depending on the type of farm and what they offer. For instance, using Donna's menu as an example, under the category of Red Meat, you might find options like Beef, which further narrows down to specific cuts like Steak, including examples such as Filet. Additionally, there are other examples like NY Strip, Prime Strip, Ribeye, and Flat Iron, showcasing the variety of styles and cuts available. Certain categories, like seafood, may not have distinct cuts, but rather include items like oysters and clams. In terms of size, farms may offer packages in different weights, such as Small, Medium, or Large, providing customers with options to choose from. When it comes to inventory management, QR codes offer advantages similar to barcodes, with the added benefit of being able to store a larger amount of information. They can encompass details for all the categories mentioned earlier. When a farm is onboarded onto Farmer Eats, their menu is integrated into the system, ensuring accurate tracking and management of their inventory.

In an embodiment of the process, Farmer Eats takes the organized structure mentioned earlier and uses it to generate and print QR code labels. These labels are then designated to specific products and sent to the respective farm, as illustrated with Donna's Farm in this example. At the farm, when a product like a Steak Filet, which is available in only one size (one pound), is prepared, the corresponding label is affixed onto the product. Subsequently, the label is scanned using the app, and the information is stored in the database. In an embodiment, the QR codes are large enough to be accurately read by a camera phone, with a recommended size of 5×5cm to minimize the possibility of any errors.

In an embodiment, a Notifications Model within the Farmer Eats process, there are various types of notifications that serve three distinct perspectives: Consumer, Farmer, and Driver. These notifications may be initiated by the administrators of Farmer Eats, either through the admin panel or via natural connections formed during the process of buying or selling products. The admin panel provides the owner of Farmer Eats or a designated tech specialist with the ability to manage notifications sent to any type of user. For example, when the admin wishes to announce a special promotion to users, they can send a message like: "4th of July Special, BOGO Sale on our BBQ Menu!" and oversee the promotion directly within their platform.

In an embodiment, user notifications within the Farmer Eats Process may include Special or holiday deals within the marketplace will be announced as a notification. When the user verifies their account, signs up, and signs in for the first time, they will receive a welcome and verified notification. The user will be notified when they need to verify their account or update any important personal information. If a user adds items to their cart but does not check out, the user will receive a notification. When a user moves along in the ordering process, they will receive a notification. The following are all the notifications the user may receive from Farmer Eats when ordering: a. Checkout confirmation b. Farm A is processing their order c. Farm A has packed the order d. Order has been assigned to driver and is on the way to Farm A e. Driver has picked up the package and is on the way to your destination f. Driver has arrived at the destination g. Driver has delivered your package h. Give feedback on your order In an embodiment, a notification may be sent out, reminding the user to leave a review on the farm they ordered from. When the user has not ordered a product from Farmer Eats for a week, they will be notified of ordering from us. For example, "We miss you and have special deals ready for you!" When the user receives a form of communication from the driver, they will be notified whether a call or text message. An order that was made in the past will show up again as a notification to remind the user they still have the opportunity to get that delicious product again. The same will be applied when they save a product or favorite it.

In an embodiment, farmer notifications within the Farmer Eats Process may include when the farmer verifies their account, signs up, and signs in for the first time, the farmer will receive a welcome and verified notification. When the farmer submits their menu on Farmer Eats, the farmer will get a notification confirming their menu is ready and inventory can be uploaded onto the app. Each time a product is uploaded to the menu, such as an inventory count update or a new type of product, the farmer will get a notification. When a product is about to sell out or near the sellout point, the farmer will receive a notification. When a user purchases a product from a Farmer, the farmer will receive a notification that a product was sold. There are a couple of notifications that the Farmer will receive when going through the sales process: A. When a driver is assigned to the farm, the farmer will receive a notification. B. When the driver has arrived to pick up the package, the farmer will receive a notification. C. When the driver delivers the package a notification will be sent to the farmer. When a driver messages or calls a farmer, the farmer will receive a notification. When a user leaves a review on a product, the farmer will receive a notification. If the Farm is inactive and not uploading any products or updating their menu, the admin will be able to notify them of this problem. If the farmer has any personal information that needs to be updated, the farmer will receive a notification.

In an embodiment, driver notifications within the Farmer Eats Process may include when the driver verifies their account, signs up, and signs in for the first time, the farmer will receive a welcome and verified notification. When the Driver updates their status online, the driver will receive a notification regarding orders being sent to them very soon. If a driver has been inactive for a long period of time, the driver will receive a notification to get on the app and start driving. If a Driver has their status as online, but has not accepted an order the entire time a notification will be sent. For example, "Are you still there?" During the Sales process, the driver will receive notifications for the following actions: a. Order has been placed near them (Driver can Accept or Decline, both will process with a notification) b. Package has been picked up from the farm c. Package has been delivered to the customer. If the user needs to contact the driver via text or call, the Driver will receive a notification. If the user leaves a review on the driver, the driver will receive a notification. If the user leaves a tip, the driver will receive a notification. If there is a special for drivers announced by the admin, the driver will receive a notification. For example, "Delivery boost in this area".

In an embodiment, a Customer Pay Model within the Farmer Eats Process Customer Pay Model includes a payment structure of the Farmer Eats Customer app being defined by several points. Here are the requirements and important considerations for both the current stage and future of the FE Customer App: Minimum Spending Requirement: To utilize the Farmer Eats App, users are required to spend a minimum of $50. This initial spending threshold is necessary to access the platform and make purchases. Users will not be able to proceed with the checkout process until this spending threshold is met. As the user base grows, this requirement may be adjusted.

In an embodiment, a Delivery and Service Fee within the Farmer Eats Process includes a step during the checkout process, in which users will encounter a combined delivery and service fee. This fee is in place to cover the costs associated with delivering the ordered products and ensuring a smooth service experience. Factors such as distance, order size, and service level will be considered when calculating this fee. Additionally, a dynamic surcharge based on gas mileage will be included as part of the delivery fee. Product Mark-Up by 30%: The Farmer Eats App applies a 30% markup on the products available for purchase. For example, if a steak is sold for $20 at the local market, it will be listed on the app for $26 before any fees are applied. This markup allows the platform to generate revenue and cover operational expenses. Monthly Memberships: The app offers two types of monthly memberships for users: Casual and Business. These memberships are configured to cater to specific user needs and preferences.

In an embodiment, a Casual User Membership within the Farmer Eats Process includes casual users being able to access special deals known as "Farmers Choice" and purchase bulk quantities of products at discounted prices. They also have the option to set up recurring drop-off periods for local restaurants. Casual users are not subject to any Farmer Eats fees for their orders. Business User Membership: Business users enjoy the benefit of purchasing bulk quantities without incurring any Farmer Eats fees. They receive special pricing and can also establish recurring drop-off periods for local restaurants. This membership type is tailored to businesses that require larger quantities of products on a regular basis. Rewards and Wallet Feature: The app incorporates a rewards system and a wallet feature to enhance the user experience. Loading Wallet and Reward Points: Users have the option to load their wallet with funds. When they do so, they receive double the amount of reward points. These reward points can be earned through purchases and other activities within the app.

In an embodiment, Guaranteed Revenue and Discounts within the Farmer Eats Process may include adding funds to the wallet ensures guaranteed revenue for Farmer Eats. Wallet-holders may also be eligible for discounts on their purchases. Every dollar spent earns the user a Farmer Eats point, aligning with the environmental theme of reducing carbon emissions through their purchases. In summary, the Farmer Eats App's Pay Model is structured to promote user engagement, provide convenience through memberships, offer incentives via rewards and discounts, and generate revenue through product mark-ups, fees, and farmer memberships.

For each user type (Customer, Farmer, and Driver), Farmer Eats Research Points are essential to understand the specific logistical requirements. In an embodiment, Driver Logistics within the Farmer Eats Process includes an Order Confirmation System includes a Ticket System, Driver Availability, and consideration of Vehicle Capacity based on size and type. The Path System for Delivery involves tracking the current location of the driver. The Payment Structure to Drivers necessitates an algorithm to calculate all costs and margins within the driver side. It also requires strategies to ensure drivers receive maximum earnings without compromising margins on the product. Moreover, addressing competition with other delivery systems is crucial, especially regarding scheduling and availability. For instance, Uber Eats allows instant driving, whereas Farmer Eats may have a 1-2 day window for deliveries, requiring commitment to multiple orders in a single day. Our system should allow users to work for both companies concurrently for maximum profit.

In an embodiment, Farmer Logistics within the Farmer Eats Process includes a Shipment Process (Packaging & Processing) involving steps from a customer placing an order to the farmer obtaining, packaging, processing (including inventory management with QR codes), and handing off the product to the driver for pick-up. Additionally, implementing a QR System is crucial for effective inventory management.

In an embodiment, Customer Logistics (Use Case for order processing) within the Farmer Eats Process includes understanding the Ordering Process is essential, particularly in scenarios where the user may not be present and they select options like "meet at door" or "exchange in hand." Providing detailed explanations for each stage of order processing, starting from checkout to delivery, is imperative. Moreover, establishing protocols for drivers to document the order drop-off, whether it was handed directly to the customer or left at the doorstep, is crucial.

In an embodiment, the Farmer Showcase within the Farmer Eats Process includes deciding on the categories to be displayed on the dashboard, such as "Nearby Farms," "Produce," and "Beef," is essential for user experience. Ensuring space for farm names and logos to create brand identity and recognition. Categorizing farms by type, including Produce, Meat, and Fish, allows users to easily identify and choose farms based on their preferences. Displaying the products offered by each farm on the dashboard, along with specific examples, guides farmers in showcasing their offerings effectively.

As noted above, the hardware to implement the application includes several components working in tandem to ensure smooth operation of the system. At the core of the infrastructure, servers and cloud-based data storage systems are essential for hosting the application's backend, including databases for farm orders, driver availability, and vehicle information. These servers handle the processing of complex algorithms, including proximity matching and order assignments, as well as real-time data processing. For drivers, each is equipped with a mobile device, such as a smartphone or tablet, which runs the delivery application. These mobile devices are essential for receiving real-time notifications, providing vehicle and availability details, and using GPS to report their location and monitor their progress.

The mobile devices also interface with other hardware components, including onboard GPS systems and sensors, which provide real-time location tracking and allow for accurate distance measurements from farms to drivers. For the farms, a variety of computing devices, such as computers or tablets, may be used to access the system and place orders for delivery, as well as track the status of deliveries. Additionally, communication networks, including Wi-Fi or cellular networks, are needed to ensure that data is transmitted reliably between drivers, farms, and the central servers, enabling real-time updates and dynamic assignment of deliveries. The system also integrates with geospatial hardware, such as GPS satellites, for location-based services and ensuring proximity accuracy, while traffic monitoring sensors and services, such as Google Maps API, may provide data to optimize routes and minimize delivery delays. Finally, the hardware infrastructure also includes security systems, such as encrypted communication protocols, firewalls, and secure data storage, to protect sensitive information related to users, farms, and drivers. Together, this collection of hardware enables the operation of the delivery system, ensuring efficient order assignment and tracking.

The hardware infrastructure to implement the application relies on several types of processors, each serving distinct functions within the system. At the backend, high-performance Central Processing Units (CPUs) in servers manage the database, execute algorithms, and process requests from farms and drivers. These servers typically use multi-core processors like Intel Xeon or AMD EPYC to handle large-scale data processing and high traffic loads. Additionally, Graphics Processing Units (GPUs) may be used to accelerate optimization algorithms or machine learning models for tasks such as route planning or predictive modeling, particularly when large datasets are involved.

For the drivers, mobile devices such as smartphones or tablets use mobile processors, typically ARM-based, like Qualcomm Snapdragon or Apple's A-series chips, to handle GPS tracking, communication with the server, and receiving delivery notifications. These processors are configured to balance performance with battery efficiency, ensuring continuous operation during long hours of use. Onboard vehicle sensors and GPS systems are managed by microcontrollers (MCUs), like ARM Cortex or ESP32, which process real-time data from the vehicle's sensors and transmit it to the mobile device or server. These microcontrollers play a vital role in accurate location tracking and vehicle diagnostics.

The communication between drivers, farms, and the central system is facilitated by network processors, which manage high-speed data transfer and network protocols. These processors are typically integrated into routers, switches, and firewalls within the communication infrastructure to ensure fast, reliable, and secure transmission of data across mobile networks, Wi-Fi, and cellular networks. Additionally, edge processors may be deployed at farms or driver locations to process data locally, reducing latency and improving real-time performance. These edge devices, such as Raspberry Pi or Intel NUC, enable localized decision-making and faster response times. Together, these processors work to facilitate the operation of the application, from handling real-time data and algorithm execution to managing communication across various locations. The selection of processors depends on the system's scale, the complexity of tasks, and the need for real-time performance, facilitating a delivery management system.

In an embodiment, an example of predictive analytics in this context involves the system's processor dynamically adjusting the number of available drivers based on forecasted order demand. The process begins by analyzing historical delivery data, which includes past order volumes, delivery locations, peak times, and other relevant factors (e.g., seasonal trends, local events). The system uses this historical data to generate predictive models that estimate future demand for deliveries at specific times and locations. For instance, if the system detects a trend of high order volumes at certain times of day (e.g., afternoons or weekends) or around specific events (e.g., harvest periods), it anticipates a higher need for drivers. The predictive model can then recommend the number of drivers required for optimal coverage during these forecasted peak periods. The system adjusts by notifying drivers of anticipated demand and prompts them to update their availability in the system. If the predictive model forecasts a surge in orders, the application can automatically make recommendations to increase the number of drivers on standby, or it can send alerts to additional drivers to log in to the system during peak times.

The processor uses machine learning algorithms to continuously improve the predictions by analyzing new data as it comes in, incorporating real-time adjustments based on factors like current traffic conditions, order cancellations, or unexpected events. By adjusting the driver availability dynamically, the system ensures that the number of active drivers matches the demand for deliveries, minimizing delays and improving efficiency for both the farm and the customers. This predictive analytics approach enables the system to proactively manage resources, reducing instances of under-or over-availability of drivers and improving overall delivery service efficiency.

In an embodiment, the process of generating and assigning QR codes to products based on sales data provided by the farmer involves several algorithms working together. First, a data parsing and categorization algorithm processes the sales data, which may include product names, quantities, prices, and other details, by parsing it into a structured format such as JSON or CSV. The algorithm then categorizes the products by type (e.g., vegetables, fruits, dairy) and assigns each product a unique identifier, often based on the product's name, category, and sales volume. Next, a QR code generation algorithm takes the product's unique identifier and formats it into a URL. Using a QR code generation library, the algorithm converts this URL into a QR code image, which is then stored or linked to the product. To integrate sales and inventory management, a sales data integration and dynamic QR code assignment algorithm ensures that QR codes are assigned to products in real-time based on sales data. If a product is sold, the algorithm checks if it already has an associated QR code or triggers the creation of a new one for new products. The system keeps track of sales and updates inventory accordingly, ensuring that each sale is accurately reflected in the inventory system. Additionally, a predictive analytics algorithm monitors historical sales data to forecast demand for certain products. This algorithm anticipates which products will be in higher demand and adjusts the number of QR codes generated for these products accordingly.

Finally, a QR code printing and labeling algorithm prepares the generated QR codes for physical use. It formats the QR code images and relevant product information into printable templates, which are then sent to a printer or labeling system. The printed QR codes are affixed to product packaging or displayed for customer scanning, facilitating inventory tracking, delivery, or customer engagement. Together, these algorithms streamline the process of linking products to QR codes, automating sales tracking, inventory management, and customer interaction.

In some aspects, the techniques described herein relate to a computer system including: one or more processors; one or more memories; one or more computer-readable hardware storage devices, the one or more computer-readable hardware storage devices contain program code executable by the one or more processors via the one or more memories to implement a method for providing a farm-to-table delivery platform, the method including: providing a menu of items, by a farm; providing a quick-response (QR) code; providing one or more products from the farm; packaging the one or more products from the farm; affixing the QR code to the packaging; scanning the QR code of the packaging to add the one or more products to an inventory system; selecting one or more farms, by a user; receiving a request for an order including the one or more products from the farm; assigning the order to a driver, via an application employing a graphic user interface (GUI) on an electronic device, having a predetermined proximity to the farm; and displaying to data of the driver associated with the order.

In some aspects, the techniques described herein relate to a computer system, wherein the QR code includes encoded information that includes: a category of the product; a type of the product; and a cut type of the product, wherein the cut type is optional based on the category of the product.

In some aspects, the techniques described herein relate to a computer system, further including: a subscription-based service to manage inventory using the application, wherein farmers are charged a monthly fee to access features such as inventory management and product visibility.

In some aspects, the techniques described herein relate to a computer system, wherein the program code includes: an algorithm for generating and assigning one or more QR codes to products based on sales data provided by the farm; and a barcode scanning feature that allows the farm to scan the one or more QR codes using a camera on the electronic device.

In some aspects, the techniques described herein relate to a computer system, wherein the GUI is configured to allow one or more farmers to update product availability and pricing in real-time.

In some aspects, the techniques described herein relate to a method of order fulfillment including: providing a computer system including: one or more processors; one or more memories; and one or more computer-readable hardware storage devices, the one or more computer-readable hardware storage devices contain program code executable by the one or more processors via the one or more memories to implement a farm-to-table delivery platform; providing a menu of items, by a farm; providing a quick-response (QR) code; providing one or more products from the farm; packaging the one or more products from the farm; affixing the QR code to the packaging; scanning the QR code of the packaging to add the one or more products to an inventory system; selecting one or more farms, by a user; receiving a request for an order including the one or more products from the farm; assigning the order to a driver having a predetermined proximity to the farm; and displaying data to the driver associated with the order.

In some aspects, the techniques described herein relate to a method, wherein scanning the QR code allows for tracking of product categories, types, and cut types, and the data is stored in the inventory system.

In some aspects, the techniques described herein relate to a method, further including: enabling a user associated with the farm to manage an inventory count through an application interface; and allowing customers to browse and select products from available farms and place orders through the application.

In some aspects, the techniques described herein relate to a method, further including: displaying farm information, including certifications, hours of operation, and customer ratings, to assist the customer in making informed purchasing decisions.

In some aspects, the techniques described herein relate to a method, wherein the driver receives a notification when an order is ready for pickup, and the notification includes a farm's address, a product detail, and one or more delivery instructions.

In some aspects, the techniques described herein relate to a method, wherein the one or more processors: receiving real-time location data from the farm and one or more drivers via a communication interface; processing the real-time location data using the one or more processors to calculate the proximity between the farm and the drivers; evaluating an availability of drivers based on the proximity data and determining a most suitable driver for the order, wherein the suitability is based on factors including proximity, availability, and vehicle capacity; assigning the order to the determined driver based on the proximity and the availability criteria; updating a status of the driver and proximity of the driver in real-time as new orders are received and availability changes; optimizing a delivery route for an assigned driver by calculating the delivery route based on real-time traffic conditions, processed by the processors; providing the assigned driver with data of an order and route information via a user interface; and enabling the driver to update their availability and vehicle details in real-time through the user interface.

In some aspects, the techniques described herein relate to a method, wherein the communication interface further includes GPS devices located within vehicles and farms for transmitting real-time location data to the system.

In some aspects, the techniques described herein relate to a method, wherein the processor is configured to calculate the proximity using geographic information system (GIS) data and optimize the assignment of orders based on real-time traffic data.

In some aspects, the techniques described herein relate to a method, wherein the processor solves a Vehicle Routing Problem (VRP) or Traveling Salesman Problem (TSP) to determine the optimal delivery routes for drivers.

In some aspects, the techniques described herein relate to a method, wherein the assignment of orders to drivers is dynamically updated based on changes in driver availability, workload, and proximity, and a reassignment is handled by the processors in real-time.

In some aspects, the techniques described herein relate to a method, wherein the user interface further includes an application that allows drivers to update availability and vehicle data, and receive notifications about newly assigned orders.

In some aspects, the techniques described herein relate to a method, wherein the processor dynamically adjusts a number of available drivers based on predictive analytics of order demand and forecasts future delivery requirements based on historical data.

In some aspects, the techniques described herein relate to a computer system for implementing an order fulfillment process via a farm-to-table delivery platform, including: one or more processors; one or more memories; one or more computer-readable hardware storage devices storing program code executable by the processors to facilitate farm-to-table delivery operations, the operations including: providing a menu of products from a farm at a graphic user interface (GUI) of an electronic device; generating a Quick Response (QR) code for each individual product; packaging the products; affixing the QR code to the packaging; scanning the QR code to add the products to an inventory system; enabling a user to select one or more farms and place an order for one or more products; assigning the order to a driver located within a predetermined proximity to the farm; displaying relevant order data to the driver; completing the order fulfillment process via coordination between the farm, the driver, and a customer.

In some aspects, the techniques described herein relate to a system, wherein the QR code includes encoded information that includes: a category of the product; a type of the product; and a cut type of the product, wherein the cut type is optional based on the category of the product.

In some aspects, the techniques described herein relate to a system, further including: a subscription-based service for one or more farmers to manage their inventory using the platform, wherein the one or more farmers are charged a monthly fee to access inventory management and product visibility; and wherein the program code includes: an algorithm for generating and assigning QR codes to products based on sales data provided by the farmer; and a barcode scanning feature that allows the farmer to scan QR codes using a built-in camera on a smartphone or tablet.

An example framework for managing an ordering and delivery system, has input variables, operational constraints, and outputs to optimize logistics using a branch-and-bound method for nearest neighbor search. The system involves three main entities: farms, customers, and drivers. Farms are represented by their geographical coordinates, serving as fixed starting points for deliveries. Customers are defined by their location, order specifications, minimum order value, and preferred delivery time windows. Drivers are characterized by their current location and operational status, which determines availability for assignments.

The system relies on travel distances and times between farms and customers as essential parameters for route planning and timely deliveries. Operational constraints ensure that each driver is assigned a manageable workload and adheres to delivery schedules. These constraints include limits on the number of deliveries per driver and the total time spent on deliveries.

The objective of the system is to minimize the total travel distance for all drivers while meeting customer requirements and staying within the defined operational parameters. This optimization problem is expressed through an objective function that evaluates the assignment of drivers to routes. The function determines the allocation of deliveries to minimize total distance traveled while fulfilling all orders.

Several constraints govern the optimization process. Each order must be assigned to a single driver to prevent duplication or missed deliveries. The number of deliveries assigned to a driver must remain within their capacity, ensuring equitable distribution of tasks. The total time a driver spends, including travel and waiting periods, must stay within the allowable time limit. Customer orders must meet or exceed a specified minimum value to align with operational goals. Deliveries must also be completed within the time frames requested by customers to maintain satisfaction and meet delivery promises.

The system uses real-time data from GPS and order management platforms to calculate travel distances, predict travel times, and dynamically assign drivers to routes through the branch-and-bound algorithm. The optimization process evaluates possible route configurations to identify the arrangement that minimizes travel distance and time while adhering to all constraints. The output includes a set of optimized driver assignments, route sequences, and delivery schedules that ensure all customer requirements are met efficiently.

As noted above, Variables and Parameters include:

Farms: $F_i = (x_{fi}, y_{fi}, P_{fi})$

Where (x,y) represents the geographical coordinates of farm

Customers: $C_j = (x_{cj}, y_{cj}, O_{cj}, V_{cj}, T_{cj})$

Where $(x_{fi}, y_{fi})$ represents the geographical coordinates of customer
$O_{cj}$ represents the order details
$V_{cj}$ represents the minimum value of products ordered
$T_{cj}$ represents the preferred time window for delivery.

Drivers: $D_k = (x_{ak}, y_{ak}, S_{ak})$

Where $(x_{dk}, y_{ak})$ represents the current location of driver k and
Sak is the status (available or not),
Travel Times and Distances:
$D_{ij}$ is the distance between farm i and customer j
$T_{ij}$ is the travel time between farm i and customer j
Operational Constraints:
$M_x$ is the maximum number of deliveries allowed per driver k
$T_{max,k}$ is the maximum total delivery time allowed for driver k
Objective Function: The goal is to minimize the total distance traveled by all drivers while ensuring timely delivery within the constraints:
Minimize
Sum of I, Sum of J, Sum of K, $x_{ijk} * d_{ij}$
Where $x_{ijk}$ is a binary decision variable that equals 1 if driver k delivers products from farm i to customer j, and 0 otherwise.
Constraints:
Driver Assignment: Each order must be fulfilled by exactly one driver.
Driver Capacity: The number of deliveries per driver should not exceed their maximum capacity.
Time Constraints: The total time spent on deliveries by each driver should not exceed their maximum allowed time, including travel times and any waiting times.
Order Value: Orders must meet the minimum value of products required by customers.
Delivery Windows: Deliveries must be made within the time windows specified by the customers.

To the extent that the terms "including," "includes," "having," "has," "with," or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

The invention claimed is:

1. A computer system comprising:
one or more processors;
one or more memories;
a first edge-enabled device installed at a farm to locally process sales data and environmental metrics;
a second edge-enabled device deployed within a delivery vehicle of a driver, the second edge-enabled device comprising:
an environmental sensor; and
a global positioning system (GPS) module configured to provide real-time location data to the first edge-enabled device and the second edge-enabled device for route determination between the delivery vehicle to the farm;
wherein the one or more processors executes a queue management system configured to generate and transmit event-driven notification requests for a user;
wherein the one or more processors stores, in one or more relational databases, historical delivery data;
a scheduling algorithm executed by the one or more processors to calculate a delivery time for an order to the user based on:
an availability status of a driver,
a service area constraint, and
the historical delivery data;
wherein the one or more processors execute predictive analytics on the historical delivery data to generate estimates of the delivery time and logistics constraints;
a decentralized data exchange protocol configured to synchronize route updates between the first edge-enabled device and the second edge-enabled device for low-latency communication between the first edge-enabled device and the second edge-enabled device and the one or more processors using event-driven messaging;
wherein the decentralized data exchange protocol comprises message queuing telemetry transport (MQTT) to reduce network bandwidth usage and communication latency;
one or more machine-learning-based predictive models executed at least in part on the first edge-enabled device and the second edge-enabled device to process environmental sensor data from the environmental sensor of the second- edge enabled device and the real-time location data to refine driver-to-delivery matching for delivery of the order;
one or more computer-readable hardware storage devices, the one or more computer-readable hardware storage devices containing program code executable by the one or more processors via the one or more memories to implement a method for providing a farm-to-table delivery platform, the method comprising:
providing a menu of items, by the farm;
creating, using the first edge-enabled device, a quick-response (QR) code encapsulating a product ID, a batch detail, and farm information for one or more products from the farm;
packaging the one or more products from the farm;

affixing the QR code to a packaging of the one or more products;
scanning, using the first edge-enabled device, the QR code of the packaging to add the one or more products to an inventory system;
selecting one or more farms, by the user;
receiving a request for the order including the one or more products from the farm;
extracting, using optical character recognition (OCR), credential data, including: (i) a license number, an expiration date, and registration data, from a driver's license; and (ii) auto insurance policy information, from a driver's insurance documents, and auto-filling the credential data into a driver profile;
validating an authenticity of the credential data of a driver, using a data validation algorithm, to cross-reference the credential data from the driver profile with a government database and an insurance database through an application programming interface (API);
assigning the order to a verified driver, via an application employing a graphical user interface (GUI) on the second edge-enabled device, based on the validating the authenticity of the credential data and executing a geofencing algorithm to locally match the order to the verified driver based on a predefined radius between the second edge-enabled device and the first edge-enabled device using the GPS module provided real-time location data of the first and second edge-enabled devices, the route updates, availability of the verified driver, and vehicle capacity of the delivery vehicle for the order, without server-side recomputation; and
displaying data of the QR code, at the second edge-enabled device, to the verified driver assigned to the order.

2. The computer system of claim 1, wherein the QR code comprises encoded information that includes:
a category of the product;
a type of the product; and
a cut type of the product, wherein the cut type is optional based on the category of the product.

3. The computer system of claim 1, further comprising:
a subscription-based service to manage inventory using the application, wherein farmers are charged a monthly fee to access features such as inventory management and product visibility.

4. The computer system of claim 1, wherein the program code includes:
an algorithm for generating and assigning one or more QR codes to products based on the sales data provided by the farm; and
a barcode scanning feature that allows the farm to scan the one or more QR codes using a camera on the first edge-enabled device.

5. The computer system of claim 1, wherein the GUI is configured to allow one or more farmers to update product availability and pricing in real-time.

6. A method of order fulfillment comprising:
providing a computer system comprising:
one or more processors;
one or more memories;
a first edge-enabled device installed at a farm to locally process sales data and environmental metrics;
a second edge-enabled device deployed within a delivery vehicle of a driver, the second edge-enabled device comprising:
an environmental sensor; and a global positioning system (GPS) module configured
   to provide real-time location data to the first edge-
   enabled device and the second edge-enabled device
   for route determination;
wherein the one or more processors executes a queue
   management system configured to generate and
   transmit event-driven notification requests;
wherein the one or more processors stores, in one or
   more relational databases, historical delivery data;
a scheduling algorithm executed by the one or more
   processors to calculate a delivery time for an order to
   the user based on:
   an availability status of a driver,
   a service area constraint, and
   the historical delivery data;
wherein the one or more processors execute predictive
   analytics on the historical delivery data to generate
   estimates of the delivery time and logistics constraints;
a decentralized data exchange protocol configured to
   synchronize route updates between the first edge-
   enabled device and the second edge-enabled device
   for low-latency communication between the first
   edge-enabled device and the second edge-enabled
   device and the one or more processors using event-
   driven messaging;
wherein the decentralized data exchange protocol com-
   prises message queuing telemetry transport (MQTT)
   to reduce network bandwidth usage and communi-
   cation latency;
one or more machine-learning-based predictive models
   executed at least in part on the first edge-enabled
   device and the second edge-enabled device to pro-
   cess environmental sensor data from the environ-
   mental sensor of the second-edge enabled device and
   the real- time location data to refine driver-to-deliv-
   ery matching for delivery of the order; and
one or more computer-readable hardware storage
   devices, the one or more computer-readable hard-
   ware storage devices contain program code execut-
   able by the one or more processors via the one or
   more memories to implement a farm-to-table deliv-
   ery platform;
providing a menu of items, by the farm;
creating, using the first edge-enabled device, a quick-
   response (QR) code encapsulating a product ID, a batch
   detail, and farm information for one or more products
   from the farm;
packaging the one or more products from the farm;
affixing the QR code to a packaging of the one or more
   products;
scanning, using the first edge-enabled device, the QR
   code of the packaging to add the one or more products
   to an inventory system;
selecting one or more farms, by the user;
receiving a request for an order including the one or more
   products from the farm;
extracting, using optical character recognition (OCR),
   credential data, including: (i) a license number, an
   expiration date, and registration data, from a driver's
   license; and (ii) auto insurance policy information,
   from a driver's insurance documents, and auto-filling
   the credential data into a driver profile;
validating an authenticity of the credential data, using a
   data validation algorithm, to cross-reference the cre-
   dential data from the driver profile with a government
   database and an insurance database through an appli-
   cation programming interface (API);

assigning the order to a verified driver having a prede-
   termined proximity to the farm based on the validating
   the authenticity of the credential data and executing a
   geofencing algorithm to locally match the order to the
   verified driver based on a predefined radius between of
   the second edge-enabled device and the first edge-
   enabled device using the GPS module provided real-
   time location data of the first and second edge-enabled
   devices, the route updates, availability of the verified
   driver, and vehicle capacity of the delivery vehicle for
   the order, without server-side recomputation; and
displaying data of the QR code, at the second edge-
   enabled device, to the verified driver assigned to the
   order.

7. The method of claim 6, wherein scanning the QR code
allows for tracking of product categories, types, and cut
types, and the data is stored in the inventory system.

8. The method of claim 6, further comprising:
   enabling a user associated with the farm to manage an
      inventory count through an application interface; and
   allowing customers to browse and select products from
      available farms and place orders through the applica-
      tion interface.

9. The method of claim 6, further comprising:
   displaying the farm information, including certifications,
      hours of operation, and customer ratings, to assist the
      customer in making informed purchasing decisions.

10. The method of claim 6, wherein the driver receives a
notification when the order is ready for pickup, and the
notification includes a farm's address, a product detail, and
one or more delivery instructions.

11. The method of claim 6, wherein the one or more
processors:
   receiving the real-time location data from the farm and
      one or more drivers via a communication interface;
   updating a status of the driver and proximity of the driver
      in real-time as new orders are received and availability
      changes;
   optimizing a delivery route for an assigned driver by
      calculating the delivery route based on real-time traffic
      conditions, processed by the processors;
   providing the assigned driver with data of an order and
      route information via a user interface; and
   enabling the driver to update their availability and vehicle
      details in real-time through the user interface.

12. The method of claim 11, wherein the communication
interface further comprises GPS devices located within
vehicles and farms for transmitting the real-time location
data to the system.

13. The method of claim 11, wherein the processor is
configured to calculate the proximity using geographic
information system (GIS) data and optimize the assignment
of orders based on real-time traffic data.

14. The method of claim 11, wherein the one or more
processors solves a Vehicle Routing Problem (VRP) or
Traveling Salesman Problem (TSP) to determine the optimal
delivery routes for drivers.

15. The method of claim 11, wherein the assignment of
orders to drivers is dynamically updated based on changes in
driver availability, workload, and proximity, and a reassign-
ment is handled by the processors in real-time.

16. The method of claim 11, wherein the user interface
further comprises an application that allows drivers to
update availability and vehicle data, and receive notifica-
tions about newly assigned orders.

17. The method of claim 11, wherein the processor
dynamically adjusts a number of available drivers based on the predictive analytics of order demand and forecasts future delivery requirements based on historical data.

18. A computer system for implementing an order fulfillment process via a farm-to-table delivery platform, comprising:

one or more processors;

one or more memories;

a first edge-enabled device installed at a farm to locally process sales data and environmental metrics;

a second edge-enabled device deployed within a delivery vehicle, the second edge-enabled device comprising:

an environmental sensor; and a global positioning system (GPS) module configured to provide real-time location data to the first edge-enabled device and the second edge-enabled device for route determination between the delivery vehicle to the farm;

wherein the one or more processors executes a queue management system configured to generate and transmit event-driven notification requests;

wherein the one or more processors stores, in one or more relational databases, historical delivery data;

a scheduling algorithm executed by the one or more processors to calculate a delivery time for an order based on:

an availability status of a driver, a service area constraint, and the historical delivery data;

wherein the one or more processors execute predictive analytics on the historical delivery data to generate estimates of the delivery time and logistics constraints;

a decentralized data exchange protocol configured to synchronize route updates between the first edge-enabled device and the second edge-enabled device for low-latency communication between the first edge-enabled device and the second edge-enabled device and the one or more processors using event-driven messaging;

wherein the decentralized data exchange protocol comprises message queuing telemetry transport (MQTT) to reduce network bandwidth usage and communication latency;

one or more machine-learning-based predictive models executed at least in part on the first edge-enabled device and the second edge-enabled device to process environmental sensor data from the environmental sensor of the second-edge enabled device and the real-time location data to refine driver-to-delivery matching;

one or more computer-readable hardware storage devices storing program code executable by the processors to facilitate farm-to-table delivery operations, the operations comprising:

providing a menu of products from the farm at a graphic user interface (GUI) of an electronic device;

creating, using the first edge-enabled device, a Quick Response (QR) code encapsulating a product ID, a batch detail, and farm information for one or more products from the farm;

packaging the products;

affixing the QR code to the packaging;

scanning, using the first edge-enabled device, the QR code to add the products to an inventory system;

enabling the user to select one or more farms and place the order for one or more products;

extracting, using optical character recognition (OCR), credential data, including: (i) a license number, an expiration date, and registration data, from a driver's license; and (ii) auto insurance policy information, from a driver's insurance documents, and auto-filling the credential data into a driver profile;

validating an authenticity of the credential data of a driver, using a data validation algorithm, to cross-reference the credential data from the driver profile with a government database and an insurance database through an application programming interface (API);

assigning the order to a verified driver located within a predetermined proximity to the farm based on the validating the authenticity of the credential data and executing a geofencing algorithm to locally match the order to the verified driver based on a predefined radius between the second edge-enabled device and the first edge-enabled device using the GPS module provided real-time location data of the first and second edge-enabled devices, the route updates, availability of the verified driver, and vehicle capacity of the delivery vehicle for the order, without server-side recomputation;

displaying data of the QR code, at the second edge-enabled device, to the driver;

completing the order fulfillment process via coordination between the farm, the driver, and a customer.

19. The system of claim 18, wherein the QR code comprises encoded information that includes:

a category of the product;

a type of the product; and a cut type of the product, wherein the cut type is optional based on the category of the product.

20. The system of claim 18, further comprising:

a subscription-based service for one or more farmers to manage their inventory using the platform, wherein the one or more farmers are charged a monthly fee to access inventory management and product visibility; and wherein the program code includes:

an algorithm for generating and assigning QR codes to products based on sales data provided by the farmer; and a barcode scanning feature that allows the farmer to scan QR codes using a built-in camera on a smartphone or tablet.

* * * * *